US008547676B2

(12) United States Patent
Nagasawa et al.

(10) Patent No.: US 8,547,676 B2
(45) Date of Patent: Oct. 1, 2013

(54) OVERCURRENT PROTECTION DEVICE AND OVERCURRENT PROTECTION SYSTEM

(75) Inventors: Kazumi Nagasawa, Kosai (JP); Kaoru Kurita, Kosai (JP); Masashi Nakayama, Makinohara (JP); Ichiro Toyama, Makinohara (JP); Mitsuaki Maeda, Makinohara (JP); Shigemi Ishima, Makinohara (JP)

(73) Assignee: Yazaki Corporation, Tokyo (JP)

( * ) Notice: Subject to any disclaimer, the term of this patent is extended or adjusted under 35 U.S.C. 154(b) by 26 days.

(21) Appl. No.: 13/394,273

(22) PCT Filed: Feb. 4, 2011

(86) PCT No.: PCT/JP2011/052434
§ 371 (c)(1),
(2), (4) Date: Mar. 5, 2012

(87) PCT Pub. No.: WO2011/096545
PCT Pub. Date: Aug. 11, 2011

(65) Prior Publication Data
US 2012/0170166 A1    Jul. 5, 2012

(30) Foreign Application Priority Data

Feb. 5, 2010   (JP) ................................ 2010-024004

(51) Int. Cl.
*H02H 3/08* (2006.01)

(52) U.S. Cl.
USPC ........................................ 361/93.9; 361/93.7

(58) Field of Classification Search
USPC ........................................ 361/23, 93.7–93.9
See application file for complete search history.

(56) References Cited

U.S. PATENT DOCUMENTS 7,177,130 B2 *   2/2007   Ohshima ..................... 361/93.9
7,248,452 B2     7/2007   Ohshima
(Continued)

FOREIGN PATENT DOCUMENTS

JP    2002315177 A    10/2002
JP    2003220908 A     8/2003
(Continued)

OTHER PUBLICATIONS

International Search Report dated Apr. 26, 2011 issued in International Application No. PCT/JP2011/052434 (PCT/ISA/210).

(Continued)

*Primary Examiner* — Danny Nguyen
(74) *Attorney, Agent, or Firm* — Sughrue Mion, PLLC

(57) ABSTRACT

Provided are an overcurrent protection device and an overcurrent protection system which can provide time differences among the timings for executing the retry operations among a plurality of overcurrent protection devices connected to a common power supply. When a battery voltage (VBA) becomes a value equal to or lower than a threshold voltage after an FET (Q1) of an IC circuit (51-1) is turned on, all FETs (Q1) of the respective IC circuits are turned off, and a time until the battery voltage (VBA) reduces to a value lower than a threshold voltage after the turning-on of the FET (Q1) is clocked. When the time is smaller than 400 μsec, the count value N is incremented. Further, turning-on of the FETs (Q1) is repeated after the lapse of the standby time (Tp) set randomly. When the count value N reaches 7, the FET (Q1) of the IC circuit 51-1 is held in the turned-off state. Accordingly, only the load-driving circuit at which the dead short occurs can be stopped and the driving of the other load-driving circuits can be continued.

6 Claims, 11 Drawing Sheets

(56) References Cited

U.S. PATENT DOCUMENTS

2003/0072120 A1* 4/2003 Ishikawa et al. ............ 361/93.9
2005/0275990 A1 12/2005 Ohshima
2010/0127677 A1* 5/2010 Ohshima ...................... 323/282

FOREIGN PATENT DOCUMENTS

| JP | 200448498 A | 2/2004 |
| JP | 2009231969 A | 10/2009 |
| WO | WO 2004008500 A2 | 1/2004 |
| WO | WO 2009116589 A1 | 9/2009 |

OTHER PUBLICATIONS

Written Opinion dated Apr. 26, 2011 issued in International Application No. PCT/JP2011/052434 (PCT/ISA/237).

* cited by examiner (1)

OVERCURRENT PROTECTION DEVICE AND OVERCURRENT PROTECTION SYSTEM

TECHNICAL FIELD

The present invention relates to an overcurrent protection device and an overcurrent protection system, the overcurrent protection device being provided in plural and turning off the electronic switch of a load-driving circuit as an overcurrent generation source when an overcurrent flows through the load-driving circuit formed by a load, the electronic switch and electric wires to thereby protect the electronic switch and the electric wires provided in the load-driving circuit.

BACKGROUND ART

For example, a load such as a lamp or a motor mounted on a vehicle is connected to a battery via an electronic switch (for example, a MOSFET) and the driving and stopping operations thereof are controlled by switching the electronic switch between the turning-on and off states thereof. Further, when a failure such as a short-circuit occurs in the load and hence an overcurrent flows through the load-driving circuit, the load and a connection harness may be broken due to generated heat. Thus, in the related art, an overcurrent protection device is mounted so that when an overcurrent occurs in the load-driving circuit, the electronic switch is turned off immediately to thereby protect the electronic switch and the electric wires provided in the circuit from the overcurrent (see a Patent Literature 1, for example).

Further, when dead short occurs in the load-driving circuit, a counter electromotive force due to the impedance of the electric wiring is generated to thereby abruptly reduce the voltage on the power supply side. Thus, according to the method of detecting an overcurrent based on a comparison result between a load current and a reference current, there may arise a case that when the power supply voltage reduces a voltage equal to or lower than the operation range voltage of an operational amplifier, an overcurrent detection circuit itself can not perform its function and hence the electronic switch can not be operated normally.

Accordingly, as described in a Patent Literature 2, a method is proposed that when the power supply voltage reduces to a value lower than a preset lower limit due to the generation of a counter electromotive force, the respective electronic switches of a plurality of load-driving circuits are instantaneously turned off and a retry operation for turning the respective electronic switches on again upon the lapse of a predetermined time is executed. According to this method, when the reason of the voltage reduction is other than the dead short, each of the electronic switches can be maintained in an on-state as it is since the power supply voltage returns to the steady state due to the execution of the retry operation. On the other hand, when the dead short occurs in one of the circuits, since the electronic switch of the circuit causing the generation of the dead short can be latched on the off state, the electronic and the electric wires can be protected from overheat.

Further, the document discloses that at the time of executing the retry operation, the timings for turning the respective electronic switches on are controlled so as to have time differences thereamong (so that the respective electronic switches are not tuned on simultaneously) to thereby avoid that rush currents flowing into the respective load-driving circuits are not superimposed. In other words, at the time of executing the retry operation, the respective electronic switches are not tuned on simultaneously but turned on with time differences thereamong to thereby specify the circuit where the dead short occurs.

CITATION LIST

Patent Literature

Patent Literature 1: JP-A-2004-48498
Patent Literature 2: JP-A-2009-231969

SUMMARY OF THE INVENTION

Technical Problem

As described above, according to the example of the related art described in Patent Literature 1, consideration is not made as to the case where the power supply voltage reduces remarkably and hence the operational amplifier does not operate normally like the case of the occurrence of the dead short.

The example of the related art described in the Patent Literature 2 is configured that the electronic switches of a plurality of load-driving circuits are controlled by using the single overcurrent protection device, and the electronic switches of the respective circuits are turned off at the time of the generation of the overcurrent to thereby protect the electronic switches provided in the circuits and the electric wires connected thereto. Thus, at the time of executing the retry operation, the timings for turning the respective electronic switches on can be made different thereamong. Thus, the circuit where the dead short occurs can be discriminated easily.

However, in recent years, there has been often employed a circuit where one overcurrent protection device is provided for every one or two load-driving circuits so that each of the over current protection devices detects the generation of the overcurrent individually to thereby perform the overcurrent protection. In this case, it is not easy to turn the electronic switches of the respective circuits on with time differences thereamong at the time of executing the retry operation.

Thus, in the case where the overcurrent protection devices simultaneously detect the reduction of the power supply voltages to turn the electronic switches provided in the circuits off respectively and thereafter the retry operation is performed, there may arise a case that the respective electronic switches are turned on at the same timing (without any time difference thereamong). In such the case, there arises a problem that when a counter electromotive force is generated simultaneously with the turning-on of the electronic switch, it is impossible to specify the circuit where the counter electromotive force is generated.

The present invention is made in order to solve such the problem of the related arts and an object of the present invention is to provide an overcurrent protection device and an overcurrent protection system which can provide time differences among the timings for executing the retry operations among a plurality of overcurrent protection devices connected to a common power supply.

Solution to Problem

In order to achieve the object, an overcurrent protection device according to a first aspect of the invention is an overcurrent protection device for protecting a load-driving circuit having a DC power supply, an electronic switch, an electric wire and a load from an overcurrent, the overcurrent protection device including: a voltage detection unit which is configured to detect an output voltage (VBA) of the DC power supply; a clock unit which is configured to clock an elapsed time after turning the electronic switch on; a switch control unit which is configured to turn the electronic switch off when the output voltage of the DC power supply reduces to a value equal to or lower than a threshold voltage set in advance and to turn the electronic switch on again when a predetermined standby time elapses; a standby time determining unit which is configured to randomly determine the predetermined standby time when the output voltage reduces to the value equal to or lower than the threshold voltage and the electronic switch is caused to be turned off; and a count unit which is configured to count a number of occurrence of a fact that a required time until the output voltage of the DC power supply reduces to the value equal to or lower than the threshold voltage from the turning-on of the electronic switch is equal to or smaller than a preset threshold time (400 μsec, for example), wherein the switch control unit is configured to hold the turned-off state of the electronic switch irrespective of elapse of the predetermined standby time when a count value by the count unit reaches a predetermined count threshold value (seven times, for example).

In an overcurrent protection device according to a second aspect of the invention, the count unit is configured to reset the count value when a next count does not occur until a first predetermined time elapses after counting the number of occurrence.

In an overcurrent protection device according to a third aspect of the invention, after the output voltage of the DC power supply reduces to the value equal to or lower than the threshold voltage and the electronic switch is caused to be turned off, the switch control unit is configured to start clocking of the standby time when the output voltage increases to the threshold voltage.

An overcurrent protection system according to a fourth aspect of the invention is an overcurrent protection system for protecting, from overcurrent, an electric wire of a drive control circuit which includes a plurality of load-driving circuits each having an electronic switch and a load and a single DC power supply connected to each of the load-driving circuits, wherein each of the load-driving circuits includes an overcurrent protection device, the overcurrent protection device provided in one of the load-driving circuits, including: a voltage detection unit which is configured to detect an output voltage (VBA) of the DC power supply; a clock unit which is configured to clock an elapsed time after turning the electronic switch of the one of the load-driving circuits on; a switch control unit which is configured to turn the electronic switch of the one of the load-driving circuits off when the output voltage of the DC power supply reduces to a value equal to or lower than a threshold voltage set in advance and turns the electronic switch on again when a predetermined standby time elapses; a standby time determining unit which is configured, when the output voltage reduces to the value equal to or lower than the threshold voltage and the electronic switch of the one of the load-driving circuits is caused to be turned off, to determine the predetermined standby time so as to differ from standby times of the overcurrent protection devices provided in another or others of the load-driving circuits; and a count unit which is configured to count a number of occurrence of a fact that a required time until the output voltage of the DC power supply reduces to the value equal to or lower than the threshold voltage from the turning-on of the electronic switch of the one of the load-driving circuits is equal to or smaller than a preset threshold time (400 μsec, for example), wherein the switch control unit is configured to hold the turned-off state of the electronic switch irrespective of elapse of the predetermined standby time when the count value of the count unit reaches a predetermined count threshold value (seven times, for example).

In an overcurrent protection system according to a fifth aspect of the invention, the count unit is configured to reset the count value when a next count does not occur until a first predetermined time elapses after counting the number of occurrence.

In an overcurrent protection system according to a sixth aspect of the invention, after the output voltage of the DC power supply reduces to the value equal to or lower than the threshold voltage and the electronic switch is caused to be turned off, the switch control unit is configured to start clocking of the standby time when the output voltage increases to the threshold voltage.

Advantageous Effects of the Invention

According to the first aspect of the invention, the electronic switch is turned off when the output voltage of the DC power supply is detected by the voltage detection unit and the output voltage thus detected reduces to a value equal to or lower than the threshold voltage (3.3 volts, for example), and thereafter the electronic switch is turned on when the standby time determined randomly elapses. This process is repeatedly performed. Then, when a required time until the output voltage reduces to the value equal to or lower than the threshold voltage after the turning-on of the electronic switch is equal to or shorter than a threshold time (400 μsec, for example), the number of occurrence of this matter is counted. When the number of times thus counted reaches the count threshold value (seven times, for example), the electronic switch is held in the turned-off state. Thus, when the dead short occurs in the load-driving circuit, the occurrence can be detected immediately and the circuit can be held in the turned-off state, whereby the electronic switch and the electric wire provided in the circuit can be protected from the heat generated by the dead short.

Further, the standby time is determined randomly. Thus, in the case where a plurality of overcurrent protection devices are connected in parallel to the single DC power supply, when the dead short occurs in one of the circuits and the output voltage of the DC power supply reduces, the electronic switches in the remaining overcurrent protection devices are also turned off. In the remaining overcurrent protection devices, however, when the electronic switch is turned on again upon the lapse of the standby time, since the output voltage of the DC power supply does not reduce to a value equal to or lower than the threshold voltage within the threshold time after the turning-on of the electronic switch. Thus, the count value is not incremented and does not reach the count threshold value. Accordingly, the circuits where no dead short occurs can be driven continuously.

That is, since the standby time is determined randomly, the load-driving circuit at which the dead short occurs can be easily specified. Thus, only the circuit where the dead short occurs can be interrupted and the remaining circuits can be driven continuously.

According to the second aspect of the invention, when the count value does not reach the count threshold value until the elapse of the first predetermined time, this count value is reset. Thus, when the output voltage reduces to the value equal to or lower than the threshold voltage due to a reason other than the dead short, the load-driving circuit can be prevented from being interrupted erroneously.

According to the third aspect of the invention, the electronic switch is turned off when the output voltage of the DC power supply reduces to the value equal to or lower than the threshold voltage and then the clocking of the standby time is started when the output voltage increases again and exceeds the threshold voltage. Thus, the time for stating the clocking of the standby time can be determined accurately.

According to the fourth aspect of the invention, the electronic switch is turned off when the output voltage of the DC power supply is detected by the voltage detection unit of the overcurrent protection device connected to the one of the load-driving circuits and the output voltage thus detected reduces to a value equal to or lower than the threshold voltage (3.3 volts, for example), and thereafter the electronic switch of the one of the load-driving circuits is turned on when the standby time determined randomly elapses. This process is repeatedly performed. Then, when a required time until the output voltage reduces to the value equal to or lower than the threshold voltage after the turning-on of the electronic switch of the one of the load-driving circuits is equal to or shorter than a threshold time (400 μsec, for example), the number of occurrence of this matter is counted. When the number of times thus counted reaches the count threshold value (seven times, for example), the electronic switch of the one of the load-driving circuits is held in the turned-off state. Thus, when the dead short occurs in the one of the load-driving circuits, the occurrence can be detected immediately and the circuit can be held in the turned-off state, whereby the electronic switch and the electric wires provided in the circuit can be protected from the heat generated by the dead short.

Further, the standby time is determined randomly at each of the overcurrent protection devices. Thus, when the dead short occurs in the one of the load-driving circuits and the output voltage of the commonly-used DC power supply reduces, the electronic switches in the remaining overcurrent protection devices are also turned off. In the remaining overcurrent protection devices, however, when the electronic switch is turned on again upon the lapse of the standby time, since the output voltage of the DC power supply does not reduce to the value equal to or lower than the threshold voltage within the threshold time after the turning-on of the electronic switch. Thus, the count value is not incremented and does not reach the count threshold value. Accordingly, the circuits where no dead short occurs can be driven continuously.

That is, since the standby time is determined randomly, the load-driving circuit at which the dead short occurs can be easily specified. Thus, only the circuit where the dead short occurs can be interrupted and the remaining circuits can be driven continuously.

According to the fifth aspect of the invention, in the overcurrent protection device provided in the one of the load-driving circuits, when the count value does not reach the count threshold value until the elapse of the first predetermined time, this count value is reset. Thus, when the output voltage reduces to the value equal to or lower than the threshold voltage due to a reason other than the dead short, the circuit can be prevented from being interrupted erroneously.

According to the sixth aspect of the invention, the electronic switch is turned off when the output voltage of the DC power supply reduces to the value equal to or lower than the threshold voltage and then the clocking of the standby time is started when the output voltage increases again and exceeds the threshold voltage. Thus, the time for stating the clocking of the standby time can be made coincide among the respective overcurrent protection devices and the standby time can be clocked accurately.

BRIEF DESCRIPTION OF THE DRAWINGS

FIG. 13 indicates timing charts showing the change of the output signals of the VBA monitor circuits of the respective overcurrent protection devices according to the embodiment of the invention, in which FIG. 13(a) is a characteristic diagram showing the change of the output voltage VBA of a battery VB, FIG. 13(b) shows the change of a signal inputted into the VBA monitor circuit 15 provided in an IC circuit 51-1 (CH1), FIG. 13(c) shows the change of the output signal thereof, FIG. 13(d) shows the change of the output signal of the VBA monitor circuit 15 provided in an IC circuit 51-2 (CH2), and FIG. 13(e) shows the change of the output signal of this VBA monitor circuit 15 provided in an IC circuit 51-3 (CH3).

MODE FOR CARRYING OUT THE INVENTION

Figure 1:
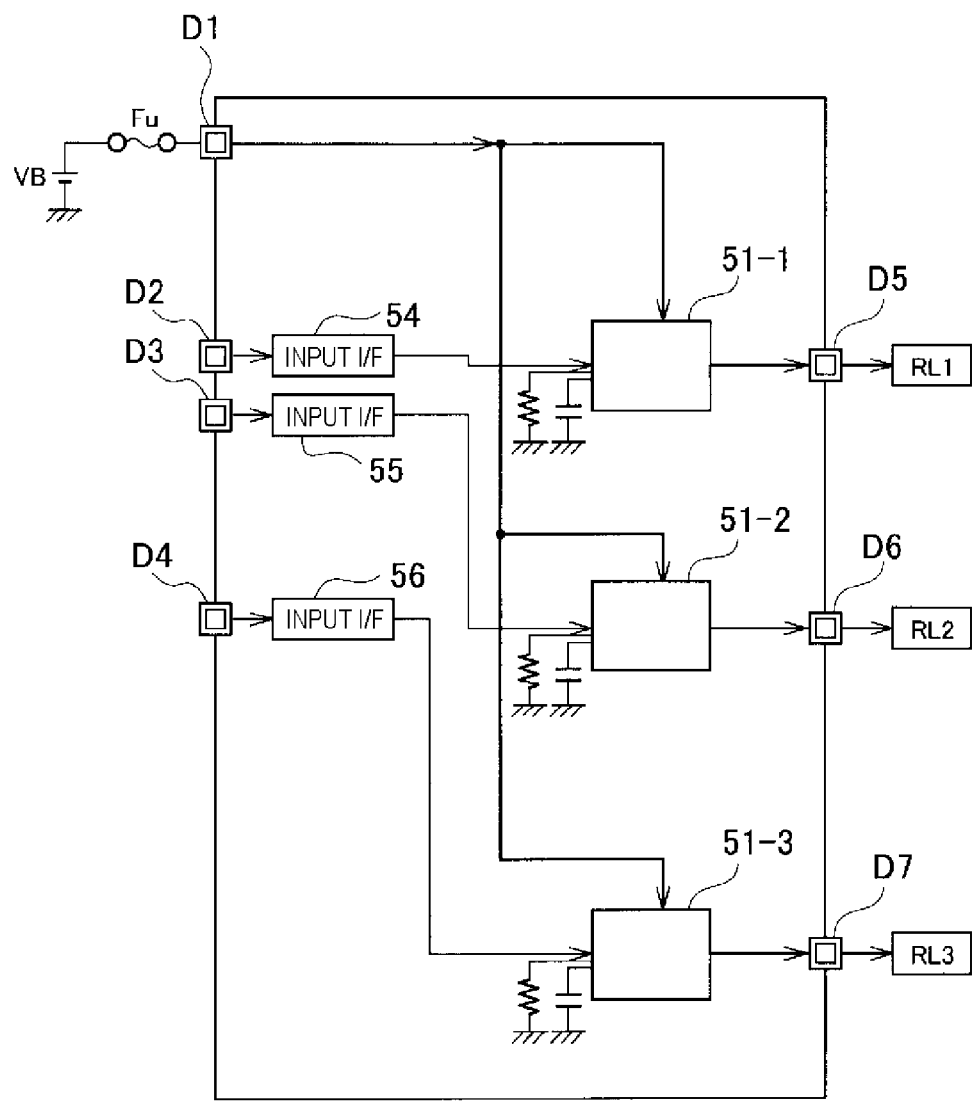
FIG. 1 is a circuit diagram showing the configuration of an overcurrent protection system in which a plurality of overcurrent protection devices are connected according to an embodiment of the invention.

Hereinafter, an embodiment of the invention will be explained on the basis of drawings. FIG. 1 is a diagram showing the configuration of an overcurrent protection system according to the embodiment of the invention, which is for example mounted on a load-driving circuit (a circuit formed by VB, Q1a, RL1 and electric wires which connect these elements) for driving respective loads RL (RL1 to RL3) such as a lamp, a motor, a horn and has a function of turning the load-driving circuit off to thereby protect an electronic switch (Q1a) provided in the circuit and electric wires from overheating when an overcurrent flows. Although this embodiment is explained as an example as to the protection system for protecting three load-driving circuits, the number of the circuits is not limited to three.

As shown in FIG. 1, this overcurrent protection system includes three IC circuits 51-1 to 51-3. Each of the IC circuits 51-1 to 51-3 is connected to a battery (DC power supply) VB via a terminal D1 and a large current fuse Fu. Further, the IC circuits 51-1 to 51-3 are respectively connected to the loads RL (RL1 to RL3) via terminals D5 to D7 so as to control the driving and stopping of each of the loads RL.

Further, the IC circuits 51-1 to 51-3 are connected to terminals D2 to D4 via input I/Fs 54 to 56 so that drive signals are inputted from the terminals D2 to D4, respectively.

Figure 2:
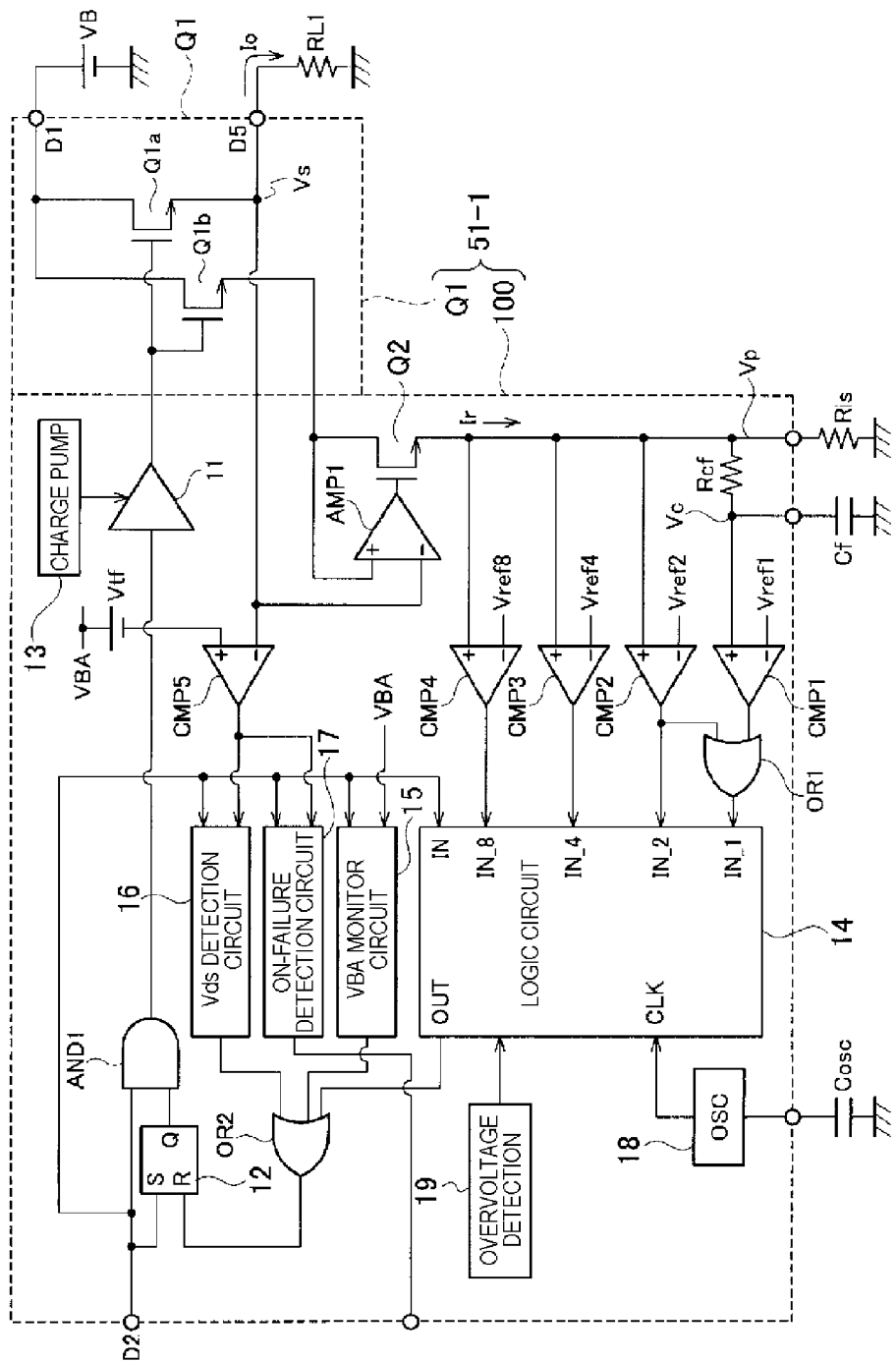
FIG. 2 is a circuit diagram showing the overcurrent protection device according to the embodiment of the invention and a load-driving circuit to which the overcurrent protection device is connected.

FIG. 2 is a circuit diagram showing the detailed configuration of the IC circuit 51-1. Since each of the three IC circuits 51-1 to 51-3 has the same configuration, the explanation will be made as to the configuration of the IC circuit 51-1. As shown in FIG. 2, the IC circuit 51-1 is, in breaf, separately configured by the overcurrent protection device 100 and a multi-source FET (Q1; hereinafter merely referred to "FET" (Q1)). Although an N-type MOSFET is used as the FET (Q1) in this embodiment, a P-type MOSFET may be used instead thereof.

The FET (Q1) is provided between the battery VB connected via the terminal D1 and the load RL1 connected via the terminal D5, and is a multi-source type MOSFET which includes two FETs, that is, a main FET (Q1a; electronic switch, hereinafter merely referred to "FET (Q1a)") and a sub FET (Q1b; hereinafter merely referred to "FET (Q1b)"), drains and gates of both FETs are made common, respectively. The driving and stopping of the load RL1 are controlled by switching the on/off states of the FET (Q1a).

The overcurrent protection device 100 includes an AND circuit AND1 and a buffer 11 connected to the output terminal of the AND circuit AND1. The output terminal of the buffer 11 is connected to the gate of the FET (Q1). A charge pump 13 is connected to the buffer 11.

Further, one of the input terminals of the AND circuit AND1 is connected to the terminal D2 and the other input terminal is connected to the Q output of a flip-flop circuit 12. Thus, when a signal of an H level is supplied to the terminal D2, since the output signal of the flip-flop circuit 12 is normally at an H level, the output signal of the AND circuit AND1 becomes an H level. Further, since this signal of the H level is added with a voltage of a predetermined level at the buffer 11 and then supplied to the gate of the FET (Q1), the FET (Q1) is turned on to thereby drive the load RL1.

Further, the overcurrent protection device 100 includes an amplifier AMP1. The minus-side input terminal of the amplifier AMP1 is connected to the source (voltage Vs) of the FET (Q1a) and the plus-side input terminal thereof is connected to the source of the FET (Q1b). The output terminal of the amplifier AMP1 is connected to the gate of an N-type MOSFET (Q2), the drain of the MOSFET (Q2) is connected to the source of the FET (Q1b), the source of the MOSFET (Q2) is connected to the one end of a current detection resistor Ris, and the other end of the current detection resistor Ris is connected to the ground. Thus, a voltage proportional to a load current I0 (hereinafter referred to "a referred voltage Vp") is generated at the one end of the current detection resistor Ris.

Further, the overcurrent protection device 100 includes five comparators CMP1 to CMP5. In the comparator CMP5 among these comparators, the plus-side input terminal thereof is connected to a power supply Vtf and the minus-side input terminal thereof is connected to the source of the FET (Q1a). Thus, when the voltage (VB-Vs) between the drain and the source of the FET (Q1a) exceeds the output voltage of the power supply Vtf, the output signal of the comparator CMP5 changes to an H level from an L level. This output signal is outputted to a Vds detection circuit 16 and an on-failure detection circuit 17.

Further, each of the four comparators CMP1 to CMP4 is provided in order to output a determination result according to the degree of an overcurrent flowing into the load-driving circuit. The plus-side input terminal of each of the comparators CMP2 to CMP4 is connected to the source of the MOSFET (Q2) and the plus-side input terminal of the comparator CMP1 is connected to the source of the MOSFET (Q2) via a resistor Rcf. Furthermore, the plus-side input terminal of the comparator CMP1 is connected to the one end of a capacitor Cf. The other end of the capacitor Cf is connected to the ground. Thus, a time constant circuit is formed by the resistor Rcf and the capacitor Cf. This time constant circuit smoothes the referred voltage Vp to generate a low-speed following voltage Vc. In the case of connecting a load which does not require the low-speed following voltage Vc, the capacitor Cf is not connected.

The output terminals of the comparators CMP1 and CMP2 are connected to the input terminals of an OR circuit OR1, respectively.

A preset reference voltage Vref1 is supplied to the minus-side input terminal of the comparator CMP1, a double voltage Vref2 which is two times as large as the reference voltage Vref1 is supplied to the minus-side input terminal of the comparator CMP2, a quadruple voltage Vref4 which is four times as large as the reference voltage Vref1 is supplied to the minus-side input terminal of the comparator CMP3, and an octuple voltage Vref8 which is eight times as large as the reference voltage Vref1 is supplied to the minus-side input terminal of the comparator CMP4.

The output terminal of the OR circuit OR1 is connected to IN-1 of a logic circuit 14, the output terminal of the comparator CMP2 is connected to IN-2 of the logic circuit 14, the output terminal of the comparator CMP3 is connected to IN-4 of the logic circuit 14, and the output terminal of the comparator CMP4 is connected to IN-8 of the logic circuit 14.

The logic circuit 14 is supplied with an overvoltage detection signal, a clock signal and a drive signal for the FET (Q1) inputted from the terminal D2 in addition to the output signals of the respective comparators CMP2 to CMP4 and the output signal of the OR circuit OR1.

The logic circuit 14 has timer functions (T1 to T4) and a count function (Ct) as described later so as to have functions of counting a duration time of overcurrent and the number of times of the occurrence of the overcurrent when the overcurrent occurs. Further, the output terminal (OUT) of the logic circuit 14 is connected to one of the three input terminals of an OR circuit OR2 so as to set the drive signal for the FET (Q1) to the H level when the output signal of the output terminal (OUT) becomes an H level.

Further, the logic circuit 14 is connected to an oscillator 18 so as to be supplied with the clock signal from the oscillator 18. The oscillator 18 is connected to one end of a capacitor Cosc. The other end of this capacitor Cosc is grounded. Furthermore, the logic circuit 14 is connected to an overvoltage detection circuit 19, whereby even when the output voltage VBA (hereinafter may be referred to a battery voltage VBA) of the battery VB becomes an overvoltage to cause overcurrent interruption, the turning-off state of the load-driving circuit is cancelled when the voltage of the battery VB returns to a normal value.

The second one of the three input terminals of the OR circuit OR2 is connected to a VBA monitor circuit 15, and the third one of the three input terminals is connected to the Vds detection circuit 16. The output terminal of the OR circuit OR2 is connected to the reset terminal of the flip-flop circuit 12.

The VBA monitor circuit 15 monitors the voltage of the battery VB. When the voltage of the battery VB reduces to a value equal to or lower than a preset threshold voltage (for example, 3.3 volts), the VBA monitor circuit 15 determines that the IC circuit 51 can not be operated normally and outputs a voltage abnormal signal to the reset input of the flip-flop circuit 12 to thereby turn the FET (Q1) off and stop the driving of the load RL1.

Figure 14:
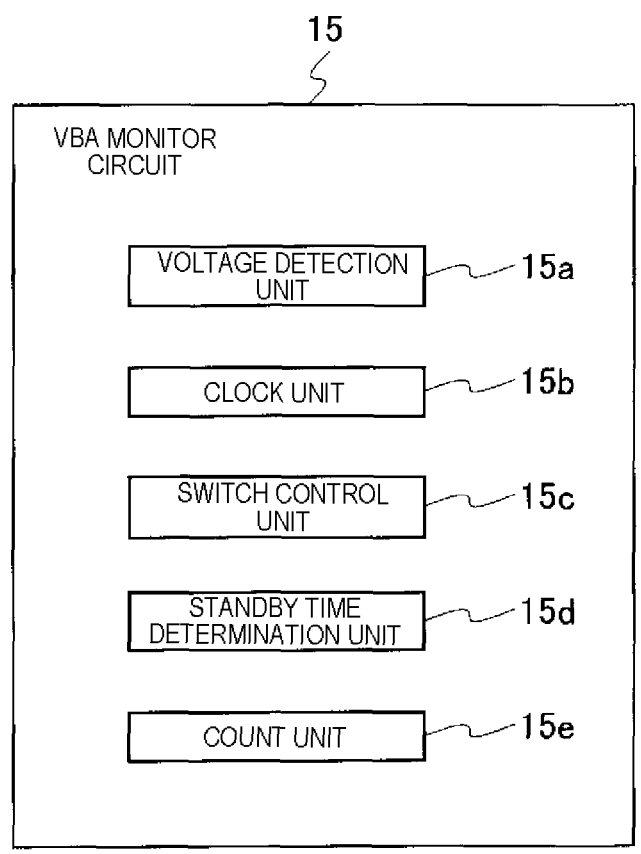
FIG. 14 is a block diagram showing the detailed configuration of the VBA monitor circuit of the respective overcurrent protection devices according to the embodiment of the invention.

As shown in FIG. 14, the VBA monitor circuit 15 includes a voltage detection unit 15a which detects the battery voltage VBA, a clock unit 15b which measures an elapsed time after the turning-on of the FET (Q1), a switch control unit 15c which turns the FET (Q1) off when the battery voltage VBA reduces to a value equal to or lower than the preset threshold voltage (for example, 3.3 volts) and then turns the FET (Q1) on again when a predetermined standby time (Tb) elapses, a standby time determination count unit 15d which randomly determines the predetermined standby time (Tb) when the battery voltage VBA reduces to a value equal to or lower than the preset threshold voltage and the FET (Q1) is turned off, and a count unit 15e which counts the number of occurrence of a fact that a required time from the turning-on of the FET (Q1) to the reduction of the battery voltage VBA to the value equal to or lower than the threshold voltage is equal to or shorter than a preset threshold time (for example, 400 µsec). The detailed operation of the VBA monitor circuit 15 will be explained later.

The Vds detection circuit 16 determines that the voltage between the drain and the source of the FET (Q1) is abnormal when the comparator CMP5 determines that the source voltage Vs of the FET (Q1a) exceeds the reference voltage Vtf, to thereby turn the FET (Q1) off and stop the driving of the load RL1.

The on-failure detection circuit 17 determines whether or not the FET (Q1) falls in an on-failure state based on the output signal of the comparator CMP5 and outputs an on-failure detection signal when the on-failure occurs.

Figure 3:
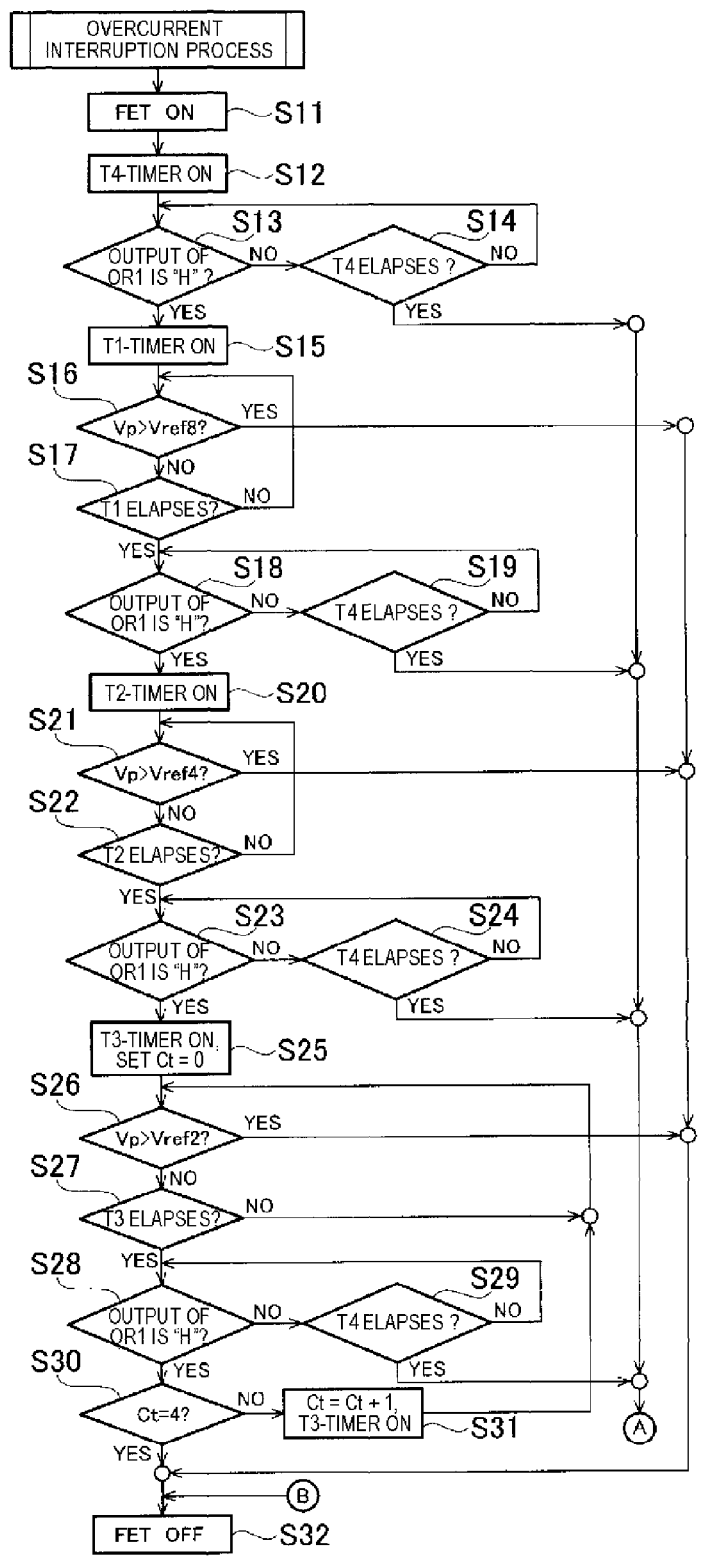
FIG. 3 is a first divided chart of a flowchart showing the processing operation of the overcurrent protection device according to the embodiment of the invention.
Figure 4:
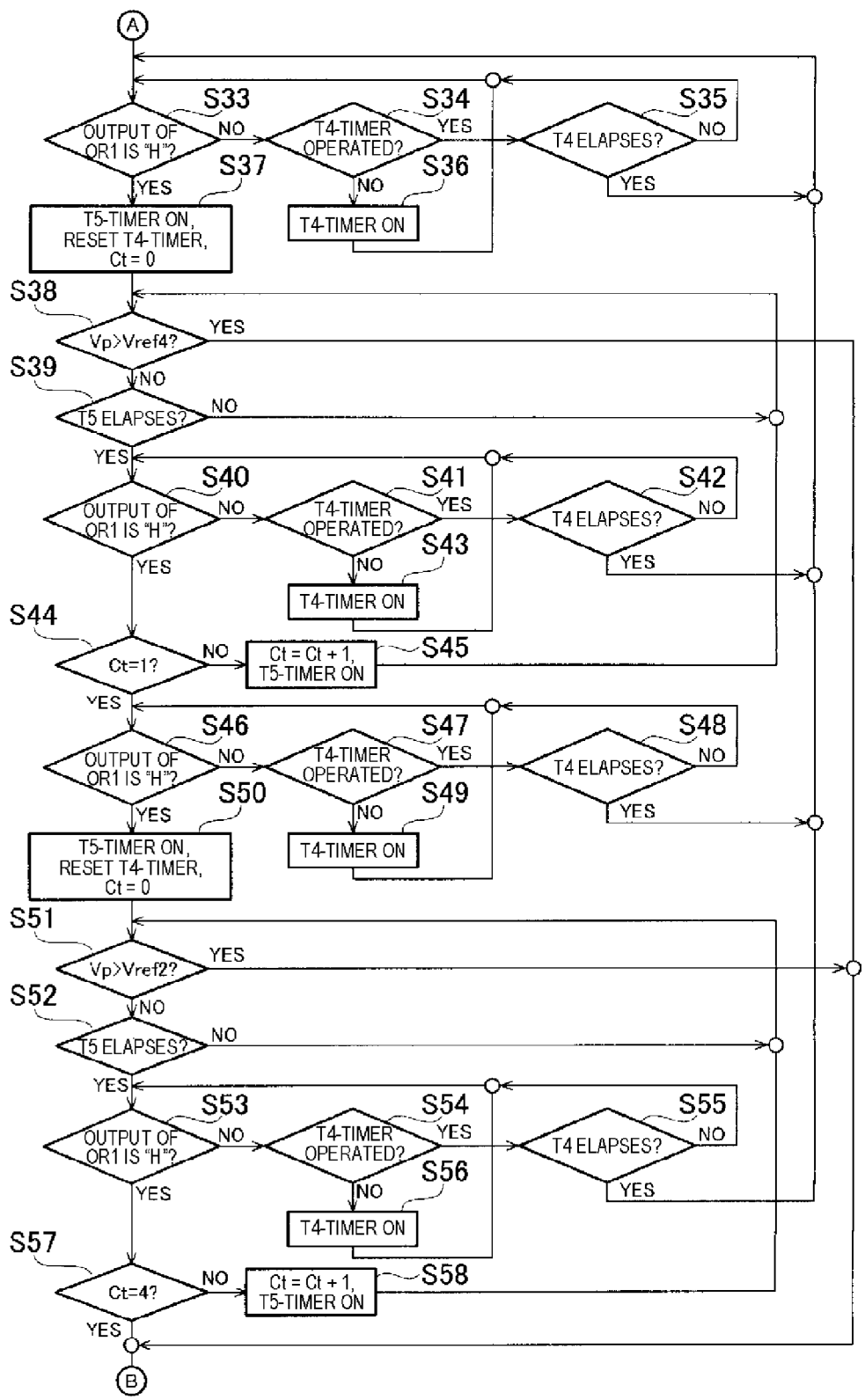
FIG. 4 is a second divided chart of the flowchart showing the processing operation of the overcurrent protection device according to the embodiment of the invention.

Next, the operation of the protection device for the load-driving circuit according to the embodiment configured in the aforesaid manner will be explained with reference to flowcharts shown in FIGS. 3 and 4. In FIGS. 3 and 4, processes from step S11 to step S32 correspond to an operation at the time of turning-on of the power supply and processes from step S33 to step S58 correspond to an operation at the time of a steady state.

First, when the drive signal for the FET (Q1) is supplied to the terminal D2, the output of the AND circuit AND1 becomes the H level due to the drive signal. Thus, a drive voltage formed by adding the output voltage of the charge pump 13 to the voltage of the battery VB is supplied to the gate of the FET (Q1) via the buffer 11. As a result, the FET (Q1) is turned on (step S11), whereby the load current I0 flows into the load RL1 via the FET (Q1a) to thereby drive the load RL1.

When the load current I0 flows into the load RL1, since the amplifier AMP1 flows a reference current Ir into the FET (Q1b) so that the source voltage Vs of the FET (Q1a) becomes equal to the source voltage of the FET (Q1b), the reference current Ir becomes a current proportional to the load current I0. Further, since the reference current Ir flows into the ground via the current detection resistor Ris (Ris<<Rcf), a referred voltage Vp generated at the current detection resistor Ris becomes a voltage proportional to the load current I0. In this embodiment, the magnitude of the overcurrent is determined by comparing the referred voltage Vp with the four kinds of reference voltages, that is, the reference voltage Vref1, the double voltage Vref2, the quadruple voltage Vref4 and the octuple voltage Vref8. The turning-on/off of the load-driving circuit is determined according to the magnitude and the duration time of the overcurrent.

The logic circuit 14 operates a T4-timer for clocking a time T4 when supplied with the drive signal for the FET (Q1) (step S12). The time T4 is set to an occurring time (for example, 2 seconds) of a rush current, for example, Next, the logic circuit 14 determines whether or not at least one of the output signals of the comparator CMP1 and the comparator CMP2 becomes the H level. In other words, it is determined whether or not the referred voltage Vp proportional to the load current I0 exceeds the double voltage Vref2 or the voltage (low-speed following voltage) Vc obtained by smoothing the referred voltage Vp exceeds the reference voltage Vref1 (step S13). Hereinafter, a state that the determination result of step S13 is Yes is referred to "satisfying the overcurrent determination" and a state that the determination result of this step is No is referred to "not satisfying the overcurrent determination".

When the load current I0 does not satisfy the overcurrent determination (a case that each of the output signals of the comparators CMP1 and CMP2 is the L level) (No in step S13), it is determined whether or not the clocking of the time T4 by the logic circuit 14 is terminated (step S14). When the time T4 elapses (Yes in step S14), the process proceeds to step S33 (FIG. 4) described later. In contrast, when the time T4 has not elapsed yet (No in step S14), the process returns to step S13.

On the other hand, when the load current I0 satisfies the overcurrent determination (a case that at least one of the output signals of the comparators CMP1 and CMP2 is the H level) (Yes in step S13), it is determined that the overcurrent occurs in the load-driving circuit, whereby a T1-timer for clocking a time T1 (T1<T4) is operated (step S15).

Figure 8:
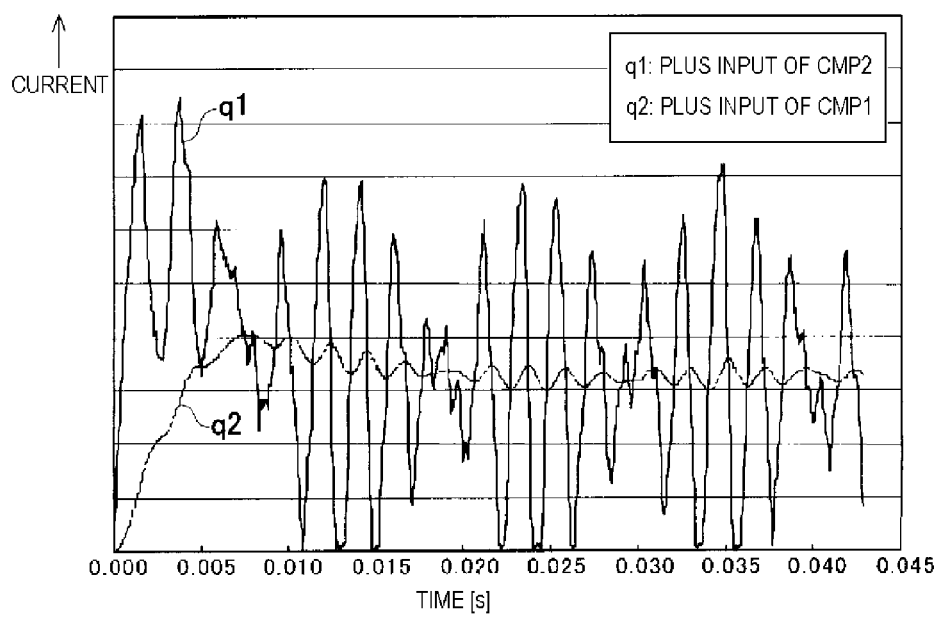
FIG. 8 is a characteristic diagram showing the change of a load current when a horn mounted on a vehicle is to be driven.

In the case of the load-driving circuit for driving a horn mounted on a vehicle, for example, a current flowing into the load-driving circuit at the time of driving the horn exhibits a waveform changing largely in its magnitude with a short period as shown by a curve q1 in FIG. 8, and the referred voltage Vp generated at the current detection resistor Ris also changes as shown by the curve q1. Further, the low-speed following voltage Vc obtained passing through the time constant circuit has a smoothed waveform as shown by a curve q2. When the curve q1 exceeds the double voltage Vref2 or when the curve q1 exceeds the reference voltage Vref1, the output signal of the OR circuit OR1 becomes the H level.

Next, the referred voltage Vp proportional to the load current I0 is compared with the octuple voltage Vref8 (step S16). As a result of the comparison, when it is determined that the referred voltage Vp exceeds the octuple voltage Vref8 (Yes in step S16), the logic circuit 14 outputs a stop signal (signal of the H level) to the OR circuit OR2 to thereby turn off the drive signal for the FET (Q1) by the stop signal (step S32). That is, when an excessive load current I0 having such a degree of magnitude that the referred voltage exceeds the octuple voltage Vref8 flows into the load-driving circuit, the FET (Q1) is immediately turned off to thereby protect the load-driving circuit. In other words, a rush current having the magnitude almost eight times as large as that of the steady current flows into the load-driving circuit immediately after turning the load-driving circuit on (immediately after turning the FET (Q1) on). Thus, it is determined that a short-circuit current flows when the referred voltage exceeds the octuple voltage Vref8 which is eight times as large as the reference voltage Vref1, the load-driving circuit is turned off immediately without waiting for the lapse of the time T1.

On the other hand, when it is determined that the referred voltage Vp does not exceed the octuple voltage Vref8 (No in step S16), it is determined whether or not the time T1 elapses (step S17). That is, although the overcurrent occurs, when the referred voltage Vp corresponding to the overcurrent has such a degree of magnitude not reaching the octuple voltage Vref8, the turning-on state of the FET (Q1) is continued until the time T1 elapses.

When the time T1 elapses (Yes in step S17), as in the aforesaid step S13, the logic circuit 14 determines whether or not the load current I0 satisfies the overcurrent determination (step S18). That is, it is determined whether or not the overcurrent still occurs after the time T1 elapsed.

When it is determined that the overcurrent determination is not satisfied (No in step S18), it is determined that the load current I0 returns to the steady current and it is determined whether or not the logic circuit 14 terminates the clocking of the time T4 (step S19). When the time T4 elapses (Yes in step S19), the process proceeds to step S33 (FIG. 4). In contrast, when the time T4 has no yet elapsed (No in step S19), the process returns to step S18.

On the other hand, when it is determined that the overcurrent I0 satisfies the overcurrent determination (Yes in step S18), it is determined that the overcurrent still occurs at the load-driving circuit despite that the referred voltage Vp is lower than the octuple voltage Vref8. Thus, a T2-timer for counting a time T2 (a predetermined time; T1<T2<T4) is operated (step S20).

Thereafter, the referred voltage Vp is compared with the quadruple voltage Vref4 (step S21). As a result of the comparison, when it is determined that the referred voltage Vp exceeds the quadruple voltage Vref4 (Yes in step S21), the logic circuit 14 turns the drive signal for the FET (Q1) off to thereby turn the FET (Q1) off (step S32). That is, when the overcurrent having such a degree of magnitude that the referred voltage exceeds the quadruple voltage Vref4 flows continuously into the load-driving circuit during a time exceeding the time T1 even immediately after the turning-on of the FET (Q1), the FET (Q1) is turned off to thereby protect the load-driving circuit.

On the other hand, when it is determined that the referred voltage Vp does not exceed the quadruple voltage Vref4 (No in step S21), it is determined whether or not the time T2 elapses (step S22). That is, although the overcurrent occurs, when the referred voltage Vp corresponding to the overcurrent has a magnitude not reaching the quadruple voltage Vref4, the turning-on state of the FET (Q1) is continued until the time T2 elapses.

When the time T2 elapses (Yes in step S22), as in the aforesaid steps S13 and S18, the logic circuit 14 determines whether or not the load current I0 satisfies the overcurrent determination (step S23). That is, it is determined whether or not the overcurrent still occurs after the elapse of the time (T1+T2) after the turning-on of the FET (Q1).

When the overcurrent I0 does not satisfy the overcurrent determination (No in step S23), it is determined that the load current I0 returns to the steady current and it is determined whether or not the logic circuit 14 terminates the clocking of the time T4 (step S24). When the time T4 elapses (Yes in step S24), the process proceeds to step S33 (FIG. 4). In contrast, when the time T4 has no yet elapsed (No in step S24), the process returns to step S23.

On the other hand, when the overcurrent I0 satisfies the overcurrent determination (Yes in step S23), it is determined that the overcurrent still occurs at the load-driving circuit despite that the referred voltage Vp is lower than the quadruple voltage Vref4. Thus, a T3-timer for counting a time T3 (a predetermined time; T2<T3<T4) is operated (step S20) and a count value Ct is set to 0 (step S25).

Next, the referred voltage Vp is compared with the double voltage Vref2 (step S26). As a result of the comparison, when it is determined that the referred voltage Vp exceeds the double voltage Vref2 (Yes in step S26), the logic circuit 14 turns the drive signal for the FET (Q1) off to thereby turn the FET (Q1) off (step S32). That is, when the overcurrent having such a degree of magnitude that the referred voltage exceeds the double voltage Vref2 flows continuously into the load-driving circuit during a time exceeding the time (T1+T2), the FET (Q1) is turned off to thereby protect the load-driving circuit.

On the other hand, when it is determined that the referred voltage Vp does not exceed the double voltage Vref2 (No in step S26), it is determined whether or not the time T3 elapses (step S27). That is, although the overcurrent occurs, when the referred voltage Vp corresponding to the overcurrent has a magnitude not reaching the double voltage Vref2, the turning-on state of the FET (Q1) is continued until the time T3 elapses.

When the time T3 elapses (Yes in step S27), as in the aforesaid steps S13, S18 and S23, the logic circuit 14 determines whether or not the load current T0 satisfies the overcurrent determination (step S28). That is, it is determined whether or not the overcurrent still occurs after the elapse of the time (T1+T2+T3) after the turning-on of the FET (Q1).

When the overcurrent T0 does not satisfy the overcurrent determination (No in step S28), it is determined that the load current T0 returns to the steady current and it is determined whether or not the logic circuit 14 terminates the clocking of the time T4 (step S29). When the time T4 elapses (Yes in step S29), the process proceeds to step S33 (FIG. 4). In contrast, when the time T4 has no yet elapsed (No in step S29), the process returns to step S28.

On the other hand, when the overcurrent T0 satisfies the overcurrent determination (Yes in step S28), it is determined that the overcurrent still occurs at the load-driving circuit despite that the referred voltage Vp is lower than the double voltage Vref2 (in this case, the output signal of the CMP1 is the H level and the output signal of the CMP2 is the L level), it is determined whether or not the count value Ct is 4 (step S30). When the count value Ct is not 4 (No in step S30), the count value Ct is incremented (Ct=Ct+1), then the T3-timer is operated (step S31) and the process returns to step S26.

Thereafter, when the count value Ct is 4 (predetermined number) at the process of step S30, the FET (Q1) is turned off (step S32). That is, in the processes of steps S26 to S31, in the case where the referred voltage Vp is lower than the double voltage Vref2 and the overcurrent I0 satisfies the overcurrent determination, that is, in the case where only the output signal of the comparator CMP1 is the H level, when the number of times of a fact that this state continues during the time T3 reaches five (five times from Ct=0 to 4), the FET (Q1) is turned off to thereby protect the load-driving circuit. Further, when the time T4 elapses before the count value Ct reaches 4, the process proceeds to step S33 (FIG. 4).

The aforesaid processes can be summarized as follows.

Figure 5:
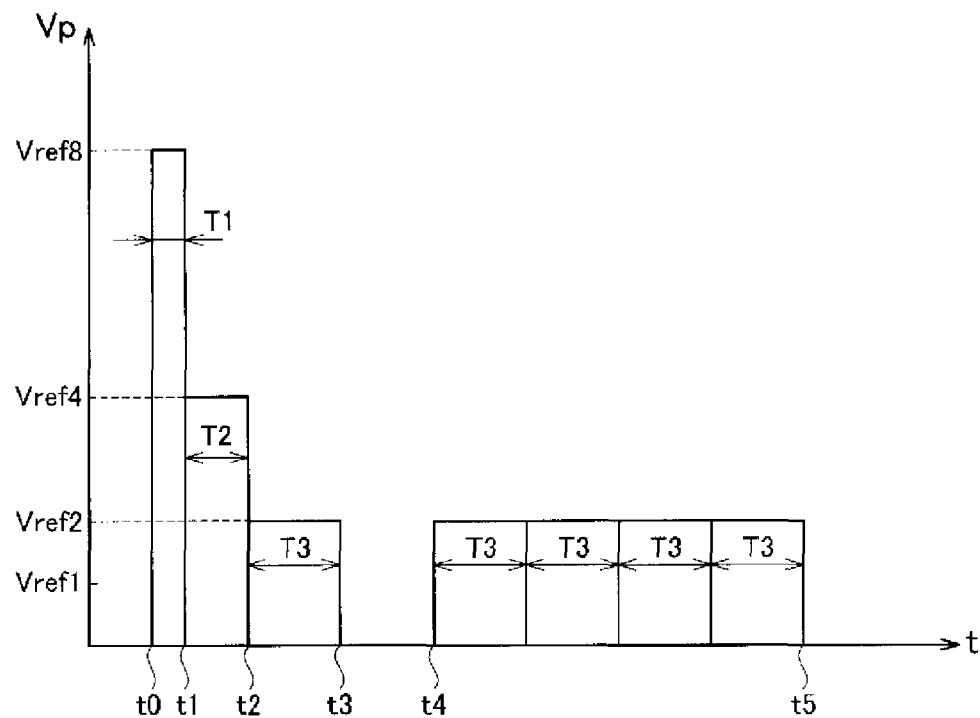
FIG. 5 is a timing chart showing the relation between an elapsed time and a voltage for determining an overcurrent immediately after the turning-on of an electronic switch, in the overcurrent protection device according to the embodiment of the invention.

(a) After the turning-on of the FET (Q1), when the overcurrent I0 satisfies the overcurrent determination and the referred voltage Vp exceeds the octuple voltage Vref8, the FET (Q1) is immediately turned off. FIG. 5 is a timing chart showing the change of the referred voltage Vp with respect to the time lapse. The FET (Q1) is turned on at a time point t0 shown in FIG. 5 and the FET (Q1) is turned off when the Vp exceeds the Vref8 during a time period from the time point t0 to a time point t1.

(b) In the case where the overcurrent I0 satisfies the overcurrent determination after the turning-on of the FET (Q1) and the referred voltage Vp exceeds the quadruple voltage Vref4 upon the lapse of the time T1 after satisfying the overcurrent determination, the FET (Q1) is turned off. That is, the FET (Q1) is turned off when Vp exceeds Vref4 during a time period from the time point t1 to a time point t2 shown in FIG. 5.

(c) When the referred voltage Vp exceeds the double voltage Vref2 upon the lapse of the time T2 after the lapse of the time T1, the FET (Q1) is turned off. That is, the FET (Q1) is turned off when Vp exceeds the Vref2 during a time period from the time point t2 to a time point t3 shown in FIG. 5.

(d) Upon the lapse of the time T2 after the lapse of the time T1, in the case where a time period during which the referred voltage Vp is lower than the double voltage Vref2 and the overcurrent I0 satisfies the overcurrent determination continues T3, when the number of times of a fact that this state is satisfied reaches 5, the FET (Q1) is turned off. That is, in the case where a time period during which the overcurrent determination is satisfied and Vp is lower than Vref2 continues T3, when this state is repeated for five times during a time period from the time point t2 to a time point t5 (except for a time period from t3 to t4) shown in FIG. 5, the FET (Q1) is turned off. Even if there is the time period (t3 to t4) not satisfying the overcurrent determination on the way, since the count value Ct is not reset so long as a time lapse after the turning-on of the FET (Q1) does not reach T4, the counting operation of the count value Ct is continued to the time point t5.

In this manner, since it is determined whether or not the FET (Q1) is to be turned off according to the magnitude and the continuation time of the load current I0 immediately after the turning-on of the FET (Q1), the erroneous turning-off due to the rush current generated upon the turning-on of the FET (Q1) can be prevented. Further, when the overcurrent occurs due to a failure such as a short-circuit, the FET (Q1) is turned off to thereby protect the FET (Q1) and the electric wires.

On the other hand, when the time T4 (2 seconds, for example) elapses after turning on the FET (Q1), the logic circuit 14 determines whether or not the load current I0 satisfies the overcurrent determination (step S33 of FIG. 4). That is, it is determined whether or not the overcurrent occurs upon the lapse of the time T4 after turning on the FET (Q1).

When it is determined that the load current does not satisfy the overcurrent determination (No in step S33), it is determined that the load current is the steady current and then it is determined whether or not the T4-timer of the logic circuit 14 is operated (step S34). When it is determined that the T4-timer is not operated, the T4-timer is operated (step S36) and then the process returns to step S33. On the other hand, when it is determined that the T4-timer is operated, it is determined whether or not the clocking of the time T4 is terminated (step S35) and the process returns to step S33. That is, in the processes from step S33 to step S36, upon the lapse of the time T4 after the turning-on of the FET (Q1) (when the rush current converges and becomes the steady current), the T4-timer is operated again to start the clocking of the time T4. Then, if the overcurrent does not occur (if No state in step S33 is continued), the processes from step S33 to step S36 are repeated. In other words, since these processes are repeated when the load-driving circuit is operated by the steady current, the turned-on state of the FET (Q1) is held.

When it is determined that the load current satisfies the overcurrent determination (Yes in step S33), the T5-timer (T5<T4) of the logic circuit 14 is operated and the T4-timer is reset. Further, the count value Ct is set to 0 (step S37).

Next, the referred voltage Vp proportional to the load current I0 is compared with the quadruple voltage Vref4 (step S38). As a result of the comparison, when it is determined that the referred voltage Vp exceeds the quadruple voltage Vref4 (Yes in step S38), the logic circuit 14 outputs the stop signal to the OR circuit OR2 to thereby turn off the drive signal for the FET (Q1) by the stop signal and turn the FET (Q1) off (step S32 of FIG. 3). That is, in a state that a time lapses after turning the FET (Q1) on and then the rush current converges, when an excessive current having such a degree of magnitude that the referred voltage exceeds the quadruple voltage Vref4 flows into the load-driving circuit, the FET (Q1) is immediately turned off to thereby protect the FET (Q1) and the electric wires.

On the other hand, when it is determined that the referred voltage Vp does not exceed the quadruple voltage Vref4 (No in step S38), it is determined whether or not the time T5 (predetermined time) elapses (step S39). That is, although the overcurrent I0 satisfies the overcurrent determination, when the referred voltage Vp corresponding to the overcurrent has such a degree of magnitude not exceeding the quadruple voltage Vref4, the turning-on state of the FET (Q1) is continued until the time T5 elapses.

When the time T5 elapses (Yes in step S39), as in the aforesaid step S33, the logic circuit 14 determines whether or not the load current I0 satisfies the overcurrent determination (step S40). That is, it is determined whether or not the overcurrent still occurs after the time T5 elapsed.

When it is determined that the overcurrent determination is not satisfied (No in step S40), it is determined that the load current I0 is the steady current and then it is determined whether or not the T4-timer of the logic circuit 14 is operated (step S41). When the 4-timer is not operated, the T4-timer is operated (step S43) and then the process returns to step S40. In contrast, when the T4-timer is operated, it is determined whether or not the clocking of the time T4 is terminated (step S42). When the time T4 elapses (Yes in step S42), the process returns to step S33. In contrast, when the time T4 has no yet elapsed (No in step S42), the process returns to step S40. In this process, when the time T4 has not elapsed yet even if it is determined that the overcurrent does not occur, the count value Ct is maintained (refer to step S44 described later). In contrast, when the time T4 elapses, the count value Ct is reset.

On the other hand, when the load current I0 satisfies the overcurrent determination (Yes in step S40), it is determined whether or not the count value Ct is 1 (step S44). Since the count value Ct is 0 initially (No in step S44), the count value Ct is incremented, then the T5-timer is operated (step S45) and the process returns to step S38.

Thereafter, the processes of step S38 to S44 are repeated, and when it is determined to be Yes in the process of step S40, since the count value Ct becomes 1 (predetermined number), the process of step S44 is determined to be Yes. That is, in the case where the load current I0 satisfies the overcurrent determination and the referred voltage Vp does not reach the quadruple voltage Vref4, when the number of times of a fact that this state continues during the time T5 reaches two, it is determined to be Yes in step S44.

When it is determined to be Yes in step S44, as in the aforesaid steps S33 and S40, the logic circuit 14 determines whether or not the overcurrent I0 satisfies the overcurrent determination (step S46). That is, it is determined whether or not the overcurrent still occurs after the count value Ct becomes 1.

When the overcurrent does not satisfy the overcurrent determination (No in step S46), it is determined that the overcurrent I0 is the steady current and then it is determined whether or not the T4-timer of the logic circuit 14 is operated (step S47). When it is determined that the T4-timer is not operated, the T4-timer is operated (step S49) and then the process returns to step S46. On the other hand, when it is determined that the T4-timer is operated (Yes in step S47), it is determined whether or not the clocking of the time T4 is terminated (step S48). When the time T4 elapses (Yes in step S48), the process returns to step S33. In contrast, when the time T4 has not elapsed yet (No in step S48), the process returns to step S46. In this process, when the time T4 has not elapsed yet even if it is determined that the overcurrent does not occur, the count value Ct is maintained. In contrast, when the time T4 elapses, the count value Ct is reset.

On the other hand, when the load current satisfies the overcurrent determination (Yes in step S46), the T5-timer is operated and the T4-timer is reset to thereby set the count value Ct to 0 (step S50). That is, when the overcurrent still occurs in the case where the state that the overcurrent having such a degree of magnitude that the referred voltage is lower than the quadruple voltage Vref4 continues during the time T5 is repeated twice, the T5-timer is operated again and the T4-timer is reset to thereby reset the count value Ct.

Thereafter, the referred voltage Vp is compared with the double voltage Vref2 (step S51). As a result of the comparison, when it is determined that the referred voltage Vp exceeds the double voltage Vref2 (Yes in step S51), the logic circuit 14 outputs the stop signal to the OR circuit OR2 to thereby turn off the drive signal for the FET (Q1) by the stop signal and turn the FET (Q1) off (step S32 of FIG. 3). That is, when the overcurrent having such a degree of magnitude that the referred voltage is lower than the quadruple voltage Vref4 continues during twice the time T5 and thereafter the overcurrent having such a degree of magnitude exceeding the double voltage Vref2 is still generated, the FET (Q1) is turned off to thereby protect the FET (Q1) and the electric wires.

On the other hand, when it is determined that the referred voltage Vp does not exceed the double voltage Vref2 (No in step S51), it is determined whether or not the time T5 elapses (step S52). That is, although the overcurrent occurs, when the referred voltage Vp corresponding to the overcurrent has such a degree of magnitude lower than the double voltage Vref2, the turning-on state of the FET (Q1) is continued until the time T5 elapses.

When the time T5 elapses (Yes in step S52), as in the aforesaid steps S33, S40 and S46, the logic circuit 14 determines whether or not the load current I0 satisfies the overcurrent determination (step S53).

As a result, when it is determined that the overcurrent determination is not satisfied (No in step S53), it is determined that the load current I0 is the steady current and then it is determined whether or not the T4-timer of the logic circuit 14 is operated (step S54). When the T4-timer is not operated, the T4-timer is operated (step S56) and then the process returns to step S53. In contrast, when the T4-timer is operated (Yes in step 54), it is determined whether or not the clocking of the time T4 is terminated (step S55). When the time T4 elapses (Yes in step S55), the process returns to step S33. In contrast, when the time T4 has no yet elapsed (No in step S55), the process returns to step S530. In this process, when the time T4 has not elapsed yet even if it is determined that the overcurrent does not occur, the count value Ct is maintained. In contrast, when the time T4 elapses, the count value Ct is reset.

On the other hand, when the load current satisfies the overcurrent determination (Yes in step S53), it is determined whether or not the count value Ct is 4. When the count value Ct is not 4 (No in step S57), the count value Ct is incremented, then the T5-timer is operated (step S58) and the process returns to step S51.

When the count value Ct is determined to be 4 (predetermined value (Yes in step S57), the FET (Q1) is turned off to thereby protect the load-driving circuit (step S32).

These processes on and after step S33 shown in FIG. 4 will be summarized in the following (e) to (g).

Figure 6:
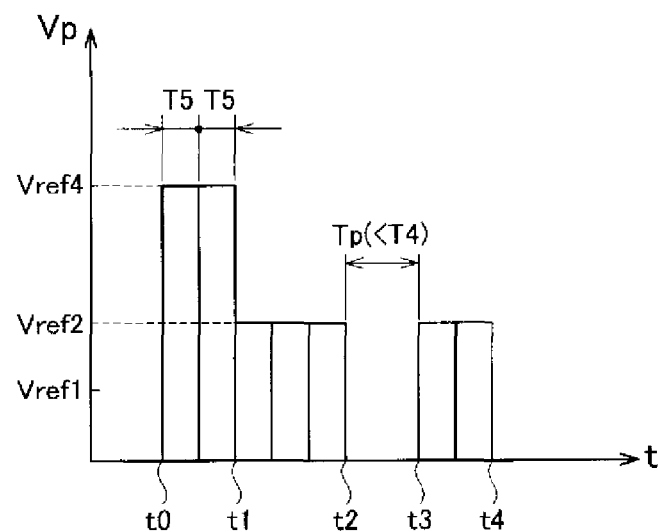
FIG. 6 is a timing chart showing the relation between an elapsed time and a voltage for determining an overcurrent in the overcurrent protection device according to the embodiment of the invention.

(e) In the case where the load current I0 satisfies the overcurrent determination in a state that the rush current is converged and the referred voltage Vp exceeds the quadruple voltage Vref4, the FET (Q1) is turned off immediately. FIG. 6 is a timing chart showing the change of the referred voltage Vp with respect to the time lapse after the convergence of the rush current. The FET (Q1) is turned off immediately when the overcurrent occurs at a time point t0 shown in FIG. 6 and Vp exceeds Vref4.

(f) In the case where the load current I0 satisfies the overcurrent determination and the state that the overcurrent having such a degree of magnitude that the referred voltage Vp is lower than the quadruple voltage Vref4 continues the time T5 is repeated twice and thereafter the referred voltage Vp exceeds the double voltage Vref2, the FET (Q1) is turned off. That is, when Vp is lower than Vref4 during a time period from a time point t0 to a time point t1 shown in FIG. 6 (a time period during which the time T5 is repeated twice) and Vp exceeds Vref2 thereafter (after the time point t1), the FET (Q1) is turned off.

Figure 7:
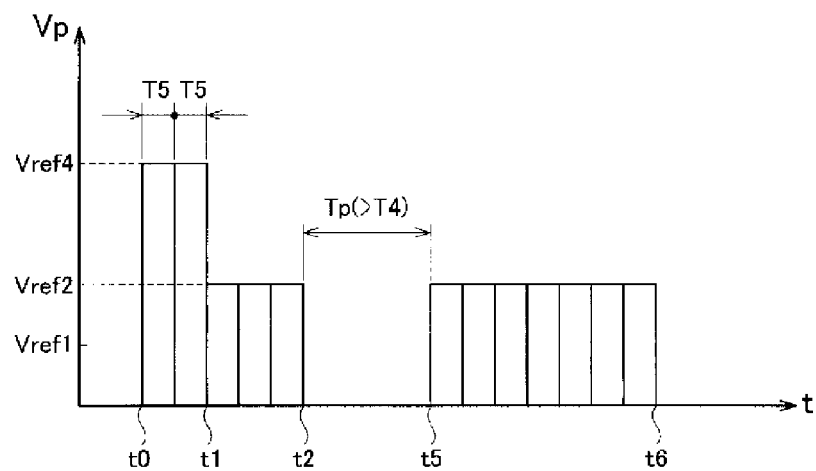
FIG. 7 is a timing chart showing the relation between an elapsed time and a voltage for determining an overcurrent in the overcurrent protection device according to the embodiment of the invention.

(g) In the case where the load current I0 satisfies the overcurrent determination and the state that the overcurrent having such a degree of magnitude that the referred voltage Vp is lower than the double voltage Vre2 continues the time T5 is repeated five times (Ct=five times from 0 to 4), the FET (Q1) is turned off. That is, for example, when the time T5 where the overcurrent occurs is repeated three times during a time period from the time point t1 to a time point t2 shown in FIG. 6, thereafter the load current restores to the steady current during a time period from the time point t2 to a time point t3 and then the time T5 where the overcurrent occurs is repeated twice after the time point t3 (the time period Tq from the time point t2 to the time point t3 is smaller than T4), the count value Ct becomes 4 at a time point t4 and hence the FET (Q1) is turned off. On the other hand, as shown in FIG. 7, when the load current restores to the steady current at the time point t2 and an elapsed time Tq until a time point t5 where the overcurrent is detected again is longer than T4, the process returns to step S33 at step S55 shown in FIG. 4 to thereby reset the count value Ct. Thus, the FET (Q1) is turned off when the overcurrent is detected during a time period from a time point t5 to a time point t6 (a time where the time T5 is repeated seven times).

In this manner, after the rush current flowing into the load-driving circuit converges, it is determined whether or not the FET (Q1) is to be turned off according to the magnitude and the continuation time of the load current T0. Thus, when the overcurrent due to a failure such as short-circuit occurred in the load-driving circuit occurs, the FET (Q1) is turned off to thereby protect the FET (Q1) and the electric wire.

Next, the operation concerning the overcurrent determination using the output signal of the OR circuit OR1 will be explained in detail with reference to FIGS. 9 to 11.

As described above, in this embodiment, the output signal of the comparator CMP2 becomes the H level when the referred voltage Vp exceeds the double voltage Vre2, and the output signal of the comparator CMP1 becomes the H level when the low-speed following voltage Vc obtained by smoothing the referred voltage Vp exceeds the reference voltage Vref1. Further, when at least one of these output signals becomes the H level, the output signal of the OR circuit OR1 becomes the H level, whereby the overcurrent determination is satisfied.

Figure 9:
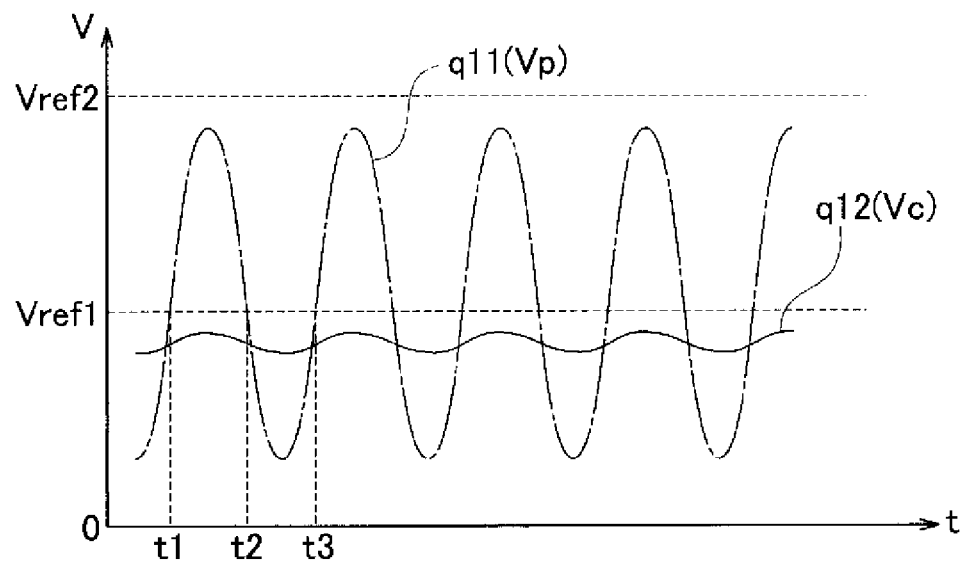
FIG. 9 is a characteristic diagram showing the relation between the change of a load current and a reference voltage Vref1, a double voltage Vref2 when the horn mounted on a vehicle is to be driven.

In other words, when the load current T0 pulsating like a curve q11 shown in FIG. 9 flows, since the peak value of the referred voltage Vp does not exceed the double voltage Vref2, the output signal of the comparator CMP2 is the L level.

On the other hand, since the low-speed following voltage Vc is smoothed as shown by a curve q12, the influence of the pulsation of the load current I0 on the low-speed following voltage can be eased. Thus, since the low-speed following voltage does not exceed the reference voltage Vref1, the output signal of the comparator CMP1 is the L level, so that the output signal of the OR circuit OR1 is kept to the L level. In other word, the overcurrent determination is not satisfied. Accordingly, in this case, since the FET (Q1) is not turned off, the load RL is continuously driven.

In contrast, in the case where the overcurrent protection device is configured that the referred voltage Vp is directly supplied to the input terminal (+ terminal) of the comparator CMP1 without using the time constant circuit so as to be compared with the reference voltage Vref1 (that is, a fact that the referred voltage Vp exceeds the reference voltage Vref1 is set as a condition for the overcurrent determination), although the output signal of the comparator CMP1 is the L level during a time period from a time point t2 to a time point t3 shown in FIG. 9, the output signal of the comparator CMP1 during a time period from a time point t1 to the time point t3 becomes the H level. Thus, since the overcurrent determination is satisfied, the FET (Q1) is turned off.

Figure 11:
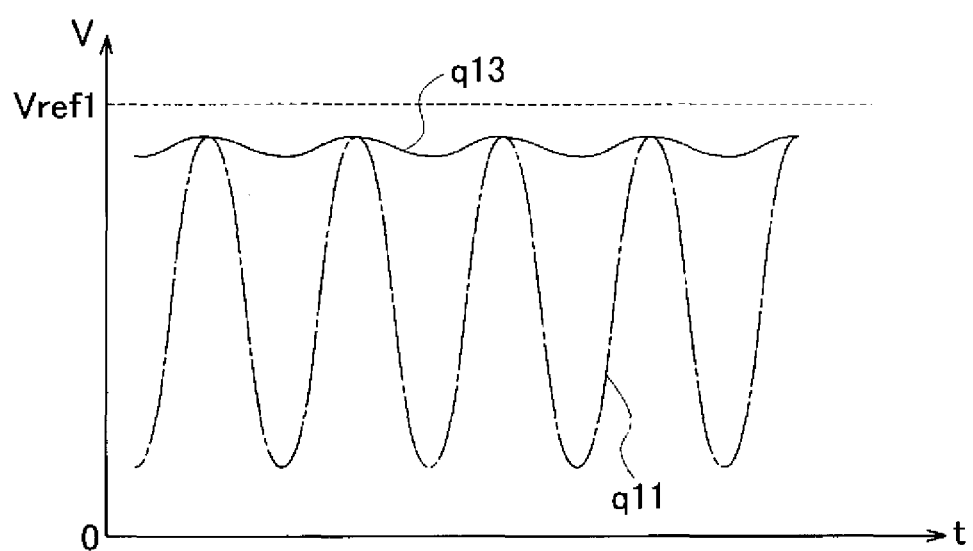
FIG. 11 is a characteristic diagram showing the relation between the change of a load current and the reference voltage Vref1 when the horn mounted on a vehicle is to be driven.

In order to solve this problem, as shown in FIG. 11, it is required to set the reference voltage Vref1 to a high value almost same as the double voltage Vref2 shown in FIG. 9. In this case, as shown by a symbol q13 in FIG. 11, when a current slightly lower than the reference voltage Vref1 flows continuously, although the FET (Q1) is not turned off, there arises a problem that the temperature of the electric wires of the load-driving circuit increases and the electric wires are overheated.

That is, according to the invention, the overcurrent determination is satisfied when at least one of the outputs of the comparators CMP1 and CMP2 becomes the H level. Thus, even when the pulsation current as shown by the symbol q1 in FIG. 8 flows continuously, the FET (Q1) can not be turned off erroneously. Further, when a low overcurrent flows continuously, such the overcurrent is detected and the FET (Q1) can be turned off.

Figure 10:
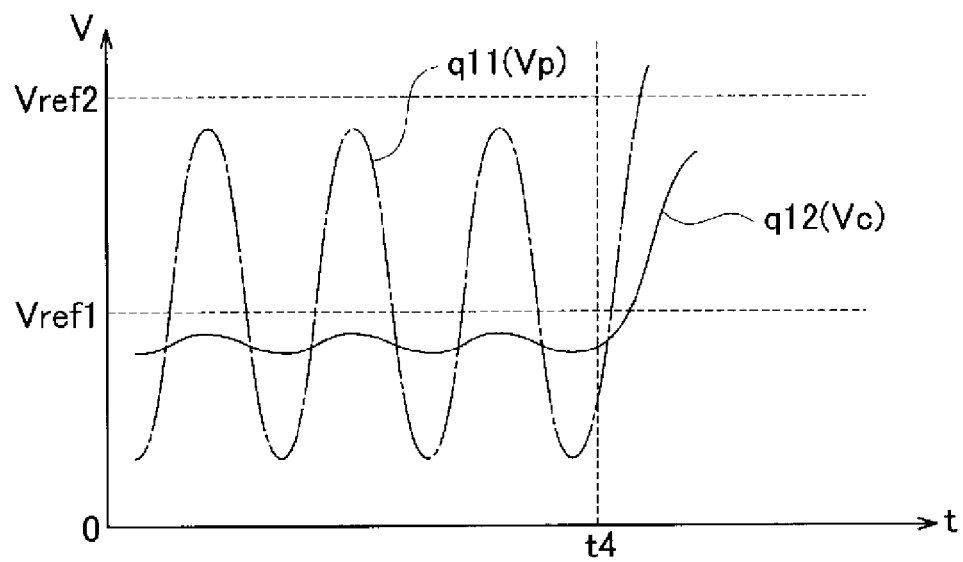
FIG. 10 is a characteristic diagram showing the relation between the change of a load current and the reference voltage Vref1, the double voltage Vref2 when the horn mounted on a vehicle is to be driven.

Further, as shown in FIG. 10, when the dead short occurs in the load-driving circuit at a time point t4, since a short-circuit current flows into the load-driving circuit, a curve q12 (low-speed following voltage Vc) shown in FIG. 10 increases gradually with a time constant. In contrast, a curve q11 (referred voltage Vp) increases abruptly and exceeds the double voltage Vref2 instantaneously and further exceeds the quadruple voltage Vref4. That is, since the referred voltage Vp exceeds the double voltage Vref2 before the low-speed following voltage Vc exceeds the reference voltage Vref1, the overcurrent determination is satisfied instantaneously. Thus, thereafter, since the FET (Q1) is turned off when the referred voltage exceeds the quadruple voltage Vref4, the FET (Q1) and the electric wires can be protected.

Next, the operation of the VBA monitor circuit 15 which is the characteristic configuration of the invention will be explained with reference to timing charts shown in FIGS. 12 and 13. In FIG. 13, FIG. 13(a) is a characteristic diagram showing the change of the output voltage VBA of the battery VB, FIG. 13(b) shows a signal inputted into the VBA monitor circuit 15 provided in an IC circuit 51-1 (CH1), FIG. 13(c) shows the output signal of this VBA monitor circuit, FIG. 13(d) shows the output signal of the VBA monitor circuit 15 provided in an IC circuit 51-2 (CH2), and FIG. 13(e) shows the output signal of this VBA monitor circuit 15 provided in an IC circuit 51-3 (CH3). Since each of the output signals shown in FIGS. 13(c) to 13(e) is outputted to the OR circuit OR2 shown in FIG. 2, "ON" represents a signal of an L level and "OFF" represents a signal of an H level.

As described above, the VBA monitor circuit 15 monitors the output voltage VBA of the battery VB and has a function of protecting the load-driving circuit in a manner that an operation for turning off the FET (Q1) is repeated for plural times (for example, seven times) when the battery voltage VBA reduces below the predetermined voltage (3.3 volts, for example), and it is determined that the dead short occurs in the load-driving circuit when the battery voltage VBA does not return to the normal voltage to thereby keep the turning-off state of the FET (Q1).

First, when the VBA monitor circuit 15 detects the input of the drive signal from the terminal D1 at a time point t11 shown in FIG. 13 (step S71), the VBA monitor circuit 15 is placed in a standby state during a turn-on time Tdon (step S72) and thereafter outputs a signal for turning on the FET (Q1) at a time point t12 (step S73). That is, the VBA monitor circuit 15 outputs an output signal of the L level to the OR circuit OR2, whereby the FET (Q1) is turned on to drive the load RL1.

Next, the VBA monitor circuit 15 starts the clocking of a first elapsed time Tx after the turning-on of the FET (Q1) (step S74). Further, the clocking of a second elapsed time Tr is started (step S75). The first elapsed time Tx is used for clocking a time until the battery voltage VBA reduces to a value lower than 3.3 volts after the turning-on of the FET (Q1). The second elapsed time Tr is used for determining whether or not a predetermined interval time Tc (first predetermined time, 0.2 seconds for example) elapsed after the turning-on of the FET (Q1).

The VBA monitor circuit 15 determines whether or not the second elapsed time Tr is smaller than the interval time Tc (step S76). When the second elapsed time Tr is equal to or longer than the interval time Tc (No in step S76), a count value N representing the number of times that the FET (Q1) is turned off is reset to 0 (step S77).

On the other hand, when the second elapsed time Tr is smaller than the interval time Tc (Yes in step S76), it is determined whether or not the battery voltage VBA is lower than 3.3 volts set as the predetermined voltage (step S78). In this process, it is determined whether or not the dead short occurs in the load-driving circuit. When the dead short occurs in the load-driving circuit, since a counter electromotive force is generated in the load-driving circuit at the time of turning the FET (Q1) on and hence the battery voltage VBA reduces abruptly, the battery voltage reduces to a value lower than 3.3 volts.

When the dead short does not occur in the load-driving circuit and the battery voltage VBA is equal to or higher than 3.3 volts (No in step S78), the processes from step S76 to S78 are repeated to maintain the turned-on state of the FET (Q1).

On the other hand, when the dead short occurs in the load-driving circuit and the battery voltage VBA reduces to a value lower than 3.3 volts (time point t13 in FIG. 13), the VBA monitor circuit 15 turns the FET (Q1) off (step S79). That is, the VBA monitor circuit 15 outputs the output signal of the H level to set the output signal of the OR circuit OR2 to the H level and set the output of the flip-flop circuit 12 to the L level to thereby turn the FET (Q1) off.

Thereafter, the VBA monitor circuit 15 sets a standby time Tp which is randomly determined by a random value (step S80). This random value can be set to an arbitrary value based on the data latch (0, 1, 2, 3) of the charge pump 13 shown in FIG. 2, and hence the standby time Tp can be set to a random time.

Next, the VBA monitor circuit 15 determines whether or not the first elapsed time Tx clocked at the process of step S74 is smaller than a preset threshold time 400 μsec (step S81). That is, the IC circuit 51-1 determines whether or not the first elapsed time Tx until the battery voltage VBA reduces to a value lower than 3.3 volts after the turning-on of the FET (Q1) is smaller than the preset threshold time 400 μsec.

When the first elapsed time is smaller than 400 μsec (Yes in step S81), the count value N representing the number of times that the FET (Q1) is turned off is incremented (N=N+1) (step S82), and the process proceeds to step S83. On the other hand, when the first elapsed time is equal to or longer than 400 μsec (No in step S81), the process proceeds to step S83 without incrementing the count value N. In this process, when the battery voltage VBA reduces to a value lower than 3.3 volts in a quite short time (within 400 μsec) after the turning-on of the FET (Q1), since the dead short occurs with a quite high probability, the count value N is incremented. Otherwise, the count value N is not incremented.

Thereafter, the VBA monitor circuit 15 determines whether or not the count value N is 0 (step S83). When the count value N is 0 (Yes in step S83), the count value N is set to 1 (step S84). In this process, the count value N processed in the IC circuits 51-1, 51-3 connected to the load-driving circuit where the dead short is not generated is maintained to 1.

In contrast, when it is determined that the count value N is not 0 (No in step S83) or when N is set to 1 in the process of step S84, it is determined whether or not the count value N is "7" set as a count threshold value (step S85). When the count value N is determined as "7" (Yes in step S85), the driving signal is latched to the L level to maintain the turned-off state of the FET (Q1) (step S88). That is, when the reduction of the battery voltage VBA due to the counter electromotive force is continued even if a retry operation for turning on the FET (Q1) again after turning off the FET (Q1) is repeated seven times, it is determined that the dead short occurs in the load-driving circuit to thereby hold the turned-off state of the FET (Q1) to stop the driving of the load RL1.

When the count value N does not reach 7 (No in step S85), it is determined whether or not the battery voltage VBA exceeds 3.3 volts set as the threshold voltage (step S86). When the battery voltage VBA does not exceed 3.3 volts (No in step S86), the operation is placed in a standby mode until the battery voltage VBA exceeds 3.3 volts. Thereafter, when the battery voltage VBA exceeds 3.3 volts at a time point t14 in FIG. 13 (Yes in step S86), the operation is placed in a standby mode during the standby time Tp determined in step S80. Then, the process returns to step S73 to turn the FET (Q1) on again.

Next, the above operation will be explained more in detail with reference to a timing chart shown in FIG. 13. Supposing that the dead short occurs in the load-driving circuit connected to the IC circuit 51-1 among the three IC circuits 51-1 (CH1), 51-2 (CH2) and 51-3 (CH3), the counter electromotive force is generated in the load-driving circuit immediately after a time point (t12) at which the FET (Q1) of the IC circuit 51-1 is turned on. Thus, the battery voltage VBA reduces to a value lower than 3.3 volts at a time point t13 upon the lapse of a time y1 to thereby turn the FET (Q1) off.

In this case, as shown in FIGS. 13(d) and 13(e), since the reduction of the battery voltage VBA is also detected in the VBA monitor circuits 15 of the other two IC circuits 51-2 (CH2) and 51-3 (CH3), the FET (Q1) of each of these VBA monitor circuits 15 is turned off to thereby protect these FETs (Q1) and the electric wires. In other words, the FET (Q1) of each of all the IC circuits 51-1 to 51-3 is turned off at the time point t13.

Further, since the dead short occurs in the IC circuit 51-1, the battery voltage VBA reduces to a value lower than 3.3 volts upon the lapse of the time y1 (y1 is smaller than 400 μsec) after the turning-on of the FET (Q1) and the cont value N is incremented to 1 (see step S82 in FIG. 2).

Thereafter, since each of the loads RL1 to RL3 connected to the IC circuits 51-1 to 51-3 is turned off, the battery voltage VBA starts to increase. When the battery voltage VBA reaches 3.3 volts or more again at the time point t14, the clocking of the standby time Tp is started. Then, the FET (Q1) of each of the IC circuits 51-1 to 51-3 is turned on upon the lapse of the standby time Tp (see step S87 in FIG. 12). In this case, since the standby time Tp is set randomly based on a random number in the process of step S80, the different standby times Tp are set for the IC circuits 51-1 to 51-3. That is, after the respective FETs (Q1) provided in the IC circuits 51-1 to 51-3 are simultaneously turned off at the time point t13, these FETs (Q1) are not turned on simultaneously but turned on with time differences thereamong. For example, as shown in FIG. 13(c), the standby times Tp1, Tp4, Tp6 are set for the IC circuit 51-1, the standby times Tp2 (>Tp1), Tp7 are set for the IC circuit 51-2, and the standby times Tp3 (<Tp3), Tp5, Tp8 are set for the IC circuit 51-3.

Thus, as shown in FIG. 13(d), the FET (Q1) of the IC circuit 51-2 is turned on again at a time point t16 later than a time point t15 at which the FET (Q1) of the IC circuit 51-1 is turned on again. Further, as shown in FIG. 13(e), the FET (Q1) of the IC circuit 51-3 is turned on again at a time point t17 earlier than the time point t15 at which the FET (Q1) of the IC circuit 51-1 is turned on again.

As a result, since the timings of the turning-on of the FETs (Q1) of the IC circuits 51-1 to 51-3 do not coincide and hence these FETs (Q1) are not turned on simultaneously, the rush currents do not coincide. Thus, the overlapping of the rush currents at the IC circuits 51-1 to 51-3 can be avoided.

Further, although the FET (Q1) of the IC circuit 51-1 is turned on again at the time point t15 upon the lapse of the time Tp1, since the dead short occurs, the FET (Q1) is turned off again at a time point t18 upon the lapse of a time y2 (smaller than 400 μsec). Thus, the count value N is incremented to 2. Then, the aforesaid processes are repeated. When the count value N reaches 7, the output signal of the IC circuit 51-1 is held at the off state (see step S88 in FIG. 12), whereby the driving of the load-driving circuit connected to the IC circuit 51-1 is stopped.

In this case, in the IC circuit 51-2 where no dead short occurs, since each of required times y5, y8 until the FET (Q1) is turned on again after the turning-on thereof is equal to or more than 400 μsec, the count value N is not incremented and kept to 1. Similarly, in the IC circuit 51-3, since each of required times y3, y6, y9 until the FET (Q1) is turned on again after the turning-on thereof is equal to or more than 400 μsec, the count value N is not incremented and kept to 1. Thus, each of these IC circuits is not latched to the turned-off state but kept in the turned-on state. Further, the battery voltage VBA does not reduce to a value lower than 3.3 volts after the IC circuit 51-1 as the generation source of the dead short is turned off. Thus, after each of the FETs (Q1) of the IC circuits 51-2 and 51-3 operated normally is turned on, these turned-on states are held and so the loads RL2, RL3 are continuously driven.

As shown in a duration from a time point t19 to a time point t20 in FIG. 13(c), when the required time y4 until the battery voltage VBA reduces to a value lower than 3.3 volts after the FET (Q1) is turned on at the time point t19 is 400 μsec or more, although the FET (Q1) is turned off at the time point t20, the count value N is not incremented. Thus, the count value N (=1) at this time point is held. Then, when the battery voltage VBA reduces to a value lower than 3.3 volts within 400 μsec after the FET (Q1) is turned on next, the count value N is incremented again from 1. As a result, the count value N is incremented upon the lapse of a time y7 and a time y10. Then, when the count value N becomes 7, the IC circuit 51-1 is held in the turned-off state.

Figure 12:
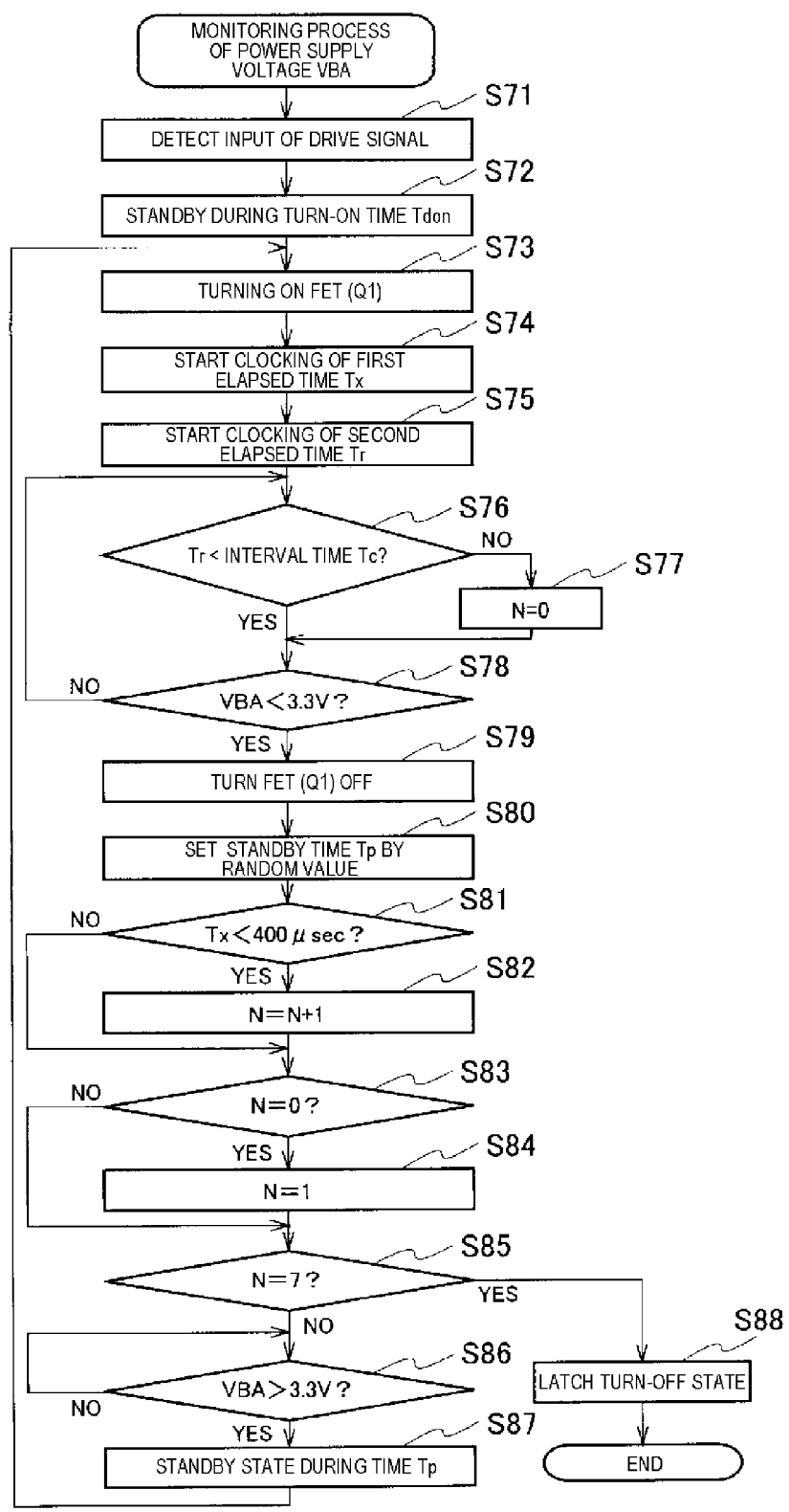
FIG. 12 is a flowchart showing the processing operation of a VBA monitor circuit of the overcurrent protection device according to the embodiment of the invention.
Figure 13:
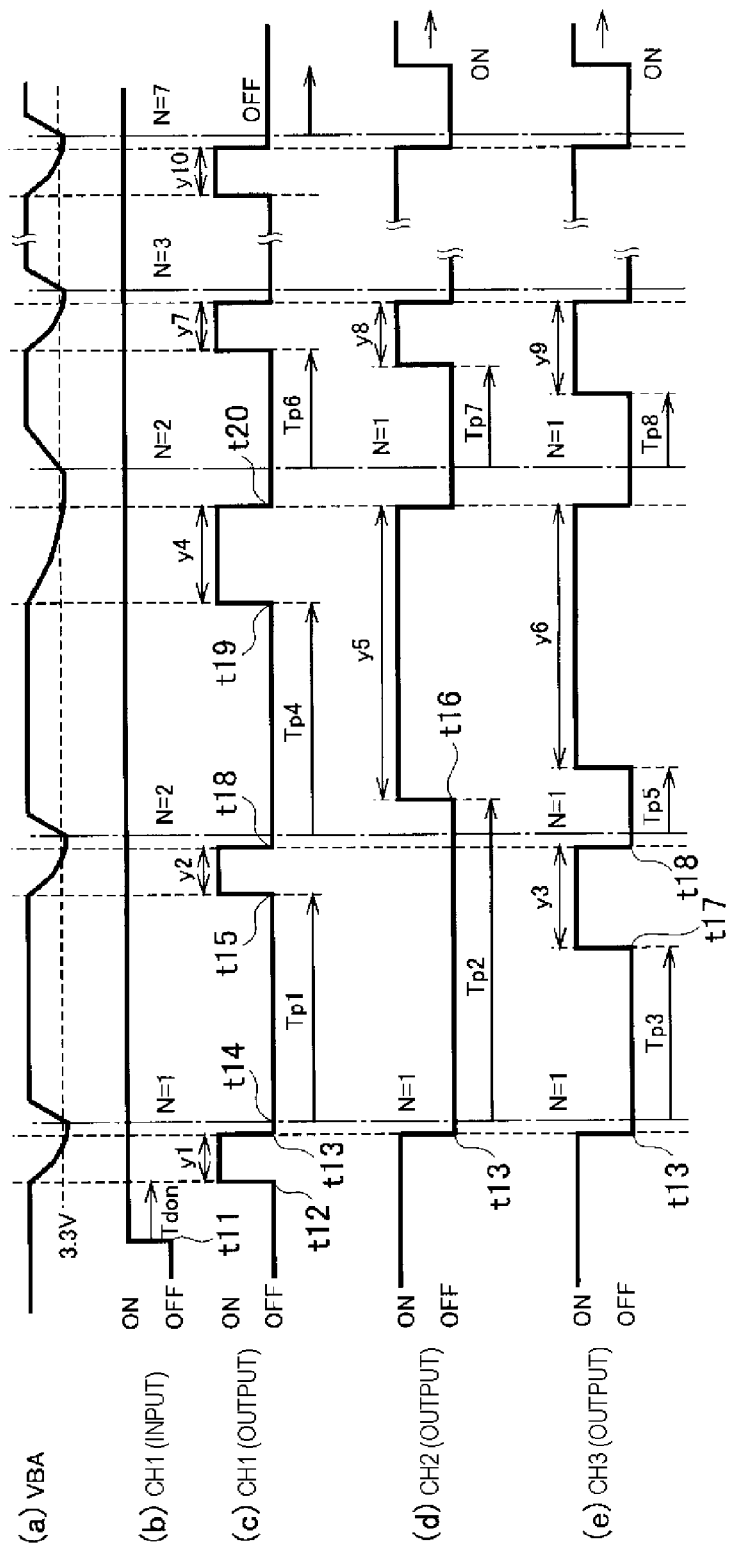

Further, when the interval time Tc set in step S76 in FIG. 12 elapses after firstly turning the FET (Q1) of the IC circuit 51-1 on, the count value N is reset. Thus, if the battery voltage VBA does not reduce continuously, the count value N is reset upon the lapse of the interval time Tc. Therefore, in the case where the battery voltage VBA reduces due to a reason other than the dead short, an erroneous operation that the load-driving circuit is kept in the turned-off state can be prevented.

In this manner, in the overcurrent protection device according to the invention, when the battery voltage VBA reduces to a value lower than 3.3 volts set as the threshold voltage after the turning-on of the FET (Q1), each of the FETs (Q1) provided at the IC circuits 51-1 to 51-3 is turned off to interrupt the respective load-driving circuits. Further, an elapsed time until the battery voltage VBA reduces to a value lower than 3.3 volts after the turning-on of the FET (Q1) is clocked. Then, when the elapsed time is smaller than 400 μsec set as the threshold time, the count value N is incremented. Further, each of the FETs (Q1) of the IC circuits 51-1 to 51-3 is turned on upon the lapse of the standby time Tp (Tp1 to Tp8) set randomly.

Thus, as to the IC circuit connected to a load at which the dead short occurs, the count value N is incremented and reaches 7, whereby the IC circuit is held in the turned-off state. In contrast, as to the IC circuit connected to a load at which the dead short does not occur, since the count value N is not incremented, the IC circuit is held in the turned-on state. As a result, only the load-driving circuit at which the dead short occurs can be stopped and the driving of the other load-driving circuits can be continued. That is, since the timings for performing the retry operations are set randomly in the plurality of overcurrent protection devices, the FETs (Q1: electronic switches) provided in the respective load-driving circuits can be avoided from being turned on simultaneously, whereby the load-driving circuit at which the dead short occurs can be discriminated easily.

Since the count value N is reset when it does not reach 7 within the interval time Tc (0.2 seconds, for example), the load-driving circuit can be prevented from being erroneously interrupted in the case that the battery voltage VBA reduces due to a reason other than the dead short.

Furthermore, after the battery voltage VBA reduces to a value lower than 3.3 volts to thereby turn the FET (Q1) off, the clocking of the standby time Tp is started when the battery voltage increases again and exceeds 3.3 volts. Thus, the timings for starting the clocking of the standby time Tp can be made coincide among the respective IC circuits 51-1 to 51-3, the standby time Tp can be clocked accurately.

As described above, although the explanation is made as to the overcurrent protection device and the overcurrent protection system according to the invention based on the embodiment shown in the figures, the invention is not limited thereto and each of the respective configurations may be replace by arbitrary one having the similar function.

For example, although the embodiment is explained as to the configuration where the three load-driving circuits are protected from the overcurrent by using the three IC circuits 51-1 to 51-3, the number of the IC circuits is not limited to three in the invention.

The invention can be used for the overcurrent protection of the FET (Q1) for driving a load mounted on a vehicle and the electric wires.

Although the invention is explained in detail with reference to the particular embodiment, it would be obvious for those skilled in the art that the invention may be changed or modified in various manners without departing from the spirit and range of the invention.

This application is based on Japanese Patent Application (Japanese Patent Application No. 2010-024004) filed on Feb. 5, 2010, the contents of which are incorporated herein by reference.

REFERENCE SIGNS LIST

11 buffer
12 flip-flop circuit
13 charge pump
14 logic circuit
15 VBA monitor circuit
16 Vds detection circuit
17 on-failure detection circuit
18 oscillator
19 overvoltage detection circuit
51-1 to 51-3 IC circuit
VB battery (DC power supply)
Q1 multi-source FET
Q1a main FET
Q1b sub FET
CMP1 to CMP5 comparator
AMP1 amplifier
OR1 OR circuit
OR2 OR circuit
AND1 AND circuit
Ris current detection resistor

The invention claimed is:

1. An overcurrent protection device for protecting a load-driving circuit having a DC power supply, an electronic switch, an electric wire and a load from an overcurrent, the overcurrent protection device comprising:
 a voltage detection unit which is configured to detect an output voltage of the DC power supply;
 a clock unit which is configured to clock an elapsed time after turning the electronic switch on;
 a switch control unit which is configured to turn the electronic switch off when the output voltage of the DC power supply reduces to a value equal to or lower than a threshold voltage set in advance and to turn the electronic switch on again when a predetermined standby time elapses;

a standby time determining unit which is configured to randomly determine the predetermined standby time when the output voltage reduces to the value equal to or lower than the threshold voltage and the electronic switch is caused to be turned off, and a count unit which is configured to count a number of occurrence of a fact that a required time until the output voltage of the DC power supply reduces to the value equal to or lower than the threshold voltage from the turning-on of the electronic switch is equal to or smaller than a preset threshold time, wherein the switch control unit is configured to hold the turned-off state of the electronic switch irrespective of elapse of the predetermined standby time when a count value by the count unit reaches a predetermined count threshold value.

2. The overcurrent protection device according to claim 1, wherein
the count unit is configured to reset the count value when a next count does not occur until a first predetermined time elapses after counting the number of occurrence.

3. The overcurrent protection device according to claim 1, wherein
after the output voltage of the DC power supply reduces to the value equal to or lower than the threshold voltage and the electronic switch is caused to be turned off, the switch control unit is configured to start clocking of the standby time when the output voltage increases to the threshold voltage.

4. An overcurrent protection system for protecting, from overcurrent, an electric wire of a drive control circuit which includes a plurality of load-driving circuits each having an electronic switch and a load and a single DC power supply connected to each of the load-driving circuits, wherein
each of the load-driving circuits includes an overcurrent protection device,
the overcurrent protection device provided in one of the load-driving circuits, comprising:
a voltage detection unit which is configured to detect an output voltage of the DC power supply;
a clock unit which is configured to clock an elapsed time after turning the electronic switch of the one of the load-driving circuits on;
a switch control unit which is configured to turn the electronic switch of the one of the load-driving circuits off when the output voltage of the DC power supply reduces to a value equal to or lower than a threshold voltage set in advance and turns the electronic switch on again when a predetermined standby time elapses;
a standby time determining unit which is configured, when the output voltage reduces to the value equal to or lower than the threshold voltage and the electronic switch of the one of the load-driving circuits is caused to be turned off, to determine the predetermined standby time so as to differ from standby times of the overcurrent protection devices provided in another or others of the load-driving circuits; and
a count unit which is configured to count a number of occurrence of a fact that a required time until the output voltage of the DC power supply reduces to the value equal to or lower than the threshold voltage from the turning-on of the electronic switch of the one of the load-driving circuits is equal to or smaller than a preset threshold time, wherein
the switch control unit is configured to hold the turned-off state of the electronic switch irrespective of elapse of the predetermined standby time when the count value of the count unit reaches a predetermined count threshold value.

5. The overcurrent protection system according to claim 4, wherein
the count unit is configured to reset the count value when a next count does not occur until a first predetermined time elapses after counting the number of occurrence.

6. The overcurrent protection system according to claim 4, wherein
after the output voltage of the DC power supply reduces to the value equal to or lower than the threshold voltage and the electronic switch is caused to be turned off, the switch control unit is configured to start clocking of the standby time when the output voltage increases to the threshold voltage.

* * * * *